United States Patent
Li

(10) Patent No.: US 10,996,886 B2
(45) Date of Patent: May 4, 2021

(54) METHOD AND SYSTEM FOR FACILITATING ATOMICITY AND LATENCY ASSURANCE ON VARIABLE SIZED I/O

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/249,407

(22) Filed: Jan. 16, 2019

(65) Prior Publication Data

US 2020/0042230 A1 Feb. 6, 2020

Related U.S. Application Data

(60) Provisional application No. 62/713,921, filed on Aug. 2, 2018.

(51) Int. Cl.
*G06F 3/06* (2006.01)
*G06F 12/02* (2006.01)

(52) U.S. Cl.
CPC .......... *G06F 3/0655* (2013.01); *G06F 3/0604* (2013.01); *G06F 3/0679* (2013.01); *G06F 12/0253* (2013.01)

(58) Field of Classification Search
CPC .... G06F 3/0655; G06F 3/0604; G06F 3/0679; G06F 3/064; G06F 3/0608;
(Continued)

(56) References Cited

U.S. PATENT DOCUMENTS 3,893,071 A 7/1975 Bossen
4,562,494 A 12/1985 Bond
(Continued)

FOREIGN PATENT DOCUMENTS

JP 2003022209 1/2003
JP 2011175422 9/2011
(Continued)

OTHER PUBLICATIONS https://web.archive.org/web/20071130235034/http://en.wikipedia.org:80/wiki/logical_block_addressing wikipedia screen shot retriefed on wayback Nov 20, 2007 showing both physical and logical addressing used historically to access data on storage devices (Year: 2007).

(Continued)

*Primary Examiner* — Hiep T Nguyen
(74) *Attorney, Agent, or Firm* — Shun Yao; Park, Vaughan, Fleming & Dowler LLP

(57) ABSTRACT

One embodiment facilitates data storage. During operation, the system selects a first page of a non-volatile storage to be recycled in a garbage collection process. The system determines that the first page is a first partial page which includes valid data and invalid data. The system combines the valid data from the first partial page with valid data from a second partial page to form a first full page, wherein a full page is aligned with a physical page in the non-volatile storage. The system writes the first full page to a first newly assigned physical page of the non-volatile storage.

20 Claims, 15 Drawing Sheets

(58) Field of Classification Search
CPC ............ G06F 12/0253; G06F 12/0346; G06F 2212/7207; G06F 2212/7208; G06F 2212/7205; G06F 2212/1044; G06F 2212/1032; G06F 11/1004; G06F 11/1044
See application file for complete search history.

(56) References Cited

U.S. PATENT DOCUMENTS

| | | |
|---|---|---|
| 4,718,067 A | 1/1988 | Peters |
| 4,775,932 A | 10/1988 | Oxley |
| 4,858,040 A | 8/1989 | Hazebrouck |
| 5,394,382 A | 2/1995 | Hu |
| 5,602,693 A | 2/1997 | Brunnett |
| 5,732,093 A | 3/1998 | Huang |
| 5,802,551 A | 9/1998 | Komatsu |
| 5,930,167 A | 7/1999 | Lee |
| 6,098,185 A | 8/2000 | Wilson |
| 6,148,377 A | 11/2000 | Carter |
| 6,226,650 B1 | 5/2001 | Mahajan et al. |
| 6,457,104 B1 | 9/2002 | Tremaine |
| 6,658,478 B1 | 12/2003 | Singhal |
| 6,795,894 B1 | 9/2004 | Neufeld |
| 7,351,072 B2 | 4/2008 | Muff |
| 7,565,454 B2 | 7/2009 | Zuberi |
| 7,599,139 B1 | 10/2009 | Bombet |
| 7,953,899 B1 | 5/2011 | Hooper |
| 7,958,433 B1 | 6/2011 | Yoon |
| 8,085,569 B2 | 12/2011 | Kim |
| 8,144,512 B2 | 3/2012 | Huang |
| 8,166,233 B2 | 4/2012 | Schibilla |
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,527,544 B1 | 9/2013 | Colgrove |
| 8,751,763 B1 | 6/2014 | Ramarao |
| 8,825,937 B2 | 9/2014 | Atkisson |
| 8,832,688 B2 | 9/2014 | Tang |
| 8,868,825 B1 | 10/2014 | Hayes |
| 8,904,061 B1 | 12/2014 | O'Brien, III |
| 9,015,561 B1 | 4/2015 | Hu |
| 9,043,545 B2 | 5/2015 | Kimmel |
| 9,088,300 B1 | 7/2015 | Chen |
| 9,092,223 B1 | 7/2015 | Pani |
| 9,129,628 B1 | 9/2015 | Fallone |
| 9,141,176 B1 | 9/2015 | Chen |
| 9,208,817 B1 | 12/2015 | Li |
| 9,280,472 B1 | 3/2016 | Dang |
| 9,280,487 B2 | 3/2016 | Candelaria |
| 9,311,939 B1 | 4/2016 | Malina |
| 9,336,340 B1 | 5/2016 | Dong |
| 9,436,595 B1 | 9/2016 | Benitez |
| 9,529,601 B1 | 12/2016 | Dharmadhikari |
| 9,588,698 B1 | 3/2017 | Karamcheti |
| 9,588,977 B1 | 3/2017 | Wang |
| 9,607,631 B2 | 3/2017 | Rausch |
| 9,747,202 B1 * | 8/2017 | Shaharabany ........ G06F 12/123 |
| 9,852,076 B1 | 12/2017 | Garg |
| 9,875,053 B2 | 1/2018 | Frid |
| 9,946,596 B2 | 4/2018 | Hashimoto |
| 1,001,316 A1 | 7/2018 | Fisher |
| 1,019,906 A1 | 2/2019 | Feldman |
| 1,022,973 A1 | 3/2019 | Natarajan |
| 1,023,519 A1 | 3/2019 | Qiu |
| 1,031,846 A1 | 6/2019 | Barzik |
| 1,036,172 A1 | 7/2019 | Lee |
| 1,043,767 A1 | 10/2019 | Koltsidas |
| 10,437,670 B1 * | 10/2019 | Koltsidas ................ G06F 3/064 |
| 1,064,252 A1 | 5/2020 | Li |
| 1,064,965 A1 | 5/2020 | Zaidman |
| 10,678,432 B1 | 6/2020 | Dreier |
| 10,756,816 B1 | 8/2020 | Dreier |
| 2001/0032324 A1 | 10/2001 | Slaughter |
| 2002/0010783 A1 | 1/2002 | Primak |
| 2002/0039260 A1 | 4/2002 | Kilmer |
| 2002/0073358 A1 | 6/2002 | Atkinson |
| 2002/0095403 A1 | 7/2002 | Chandrasekaran |
| 2002/0161890 A1 | 10/2002 | Chen |
| 2003/0145274 A1 | 7/2003 | Hwang |
| 2003/0163594 A1 | 8/2003 | Aasheim |
| 2003/0163633 A1 | 8/2003 | Aasheim |
| 2003/0217080 A1 | 11/2003 | White |
| 2004/0010545 A1 | 1/2004 | Pandya |
| 2004/0066741 A1 | 4/2004 | Dinker |
| 2004/0103238 A1 | 5/2004 | Avraham |
| 2004/0255171 A1 | 12/2004 | Zimmer |
| 2004/0268278 A1 | 12/2004 | Hoberman |
| 2005/0038954 A1 | 2/2005 | Saliba |
| 2005/0097126 A1 | 5/2005 | Cabrera |
| 2005/0149827 A1 | 7/2005 | Lambert |
| 2005/0174670 A1 | 8/2005 | Dunn |
| 2005/0177672 A1 | 8/2005 | Rao |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0031709 A1 | 2/2006 | Hiraiwa |
| 2006/0156012 A1 | 7/2006 | Beeson |
| 2007/0033323 A1 | 2/2007 | Gorobets |
| 2007/0061502 A1 | 3/2007 | Lasser |
| 2007/0101096 A1 | 5/2007 | Gorobets |
| 2007/0283081 A1 | 12/2007 | Lasser |
| 2007/0285980 A1 | 12/2007 | Shimizu |
| 2008/0034154 A1 | 2/2008 | Lee |
| 2008/0065805 A1 | 3/2008 | Wu |
| 2008/0082731 A1 | 4/2008 | Karamcheti |
| 2008/0112238 A1 | 5/2008 | Kim |
| 2008/0301532 A1 | 12/2008 | Uchikawa |
| 2009/0006667 A1 | 1/2009 | Lin |
| 2009/0089544 A1 | 4/2009 | Liu |
| 2009/0113219 A1 | 4/2009 | Aharonov |
| 2009/0183052 A1 | 7/2009 | Kanno |
| 2009/0282275 A1 | 11/2009 | Yermalayeu |
| 2009/0287956 A1 | 11/2009 | Flynn |
| 2009/0307249 A1 | 12/2009 | Koifman |
| 2009/0310412 A1 | 12/2009 | Jang |
| 2010/0169470 A1 | 7/2010 | Takashige |
| 2010/0217952 A1 | 8/2010 | Iyer |
| 2010/0229224 A1 | 9/2010 | Etchegoyen |
| 2010/0325367 A1 | 12/2010 | Kornegay |
| 2010/0332922 A1 | 12/2010 | Chang |
| 2011/0031546 A1 | 2/2011 | Uenaka |
| 2011/0055458 A1 | 3/2011 | Kuehne |
| 2011/0055471 A1 | 3/2011 | Thatcher |
| 2011/0099418 A1 | 4/2011 | Chen |
| 2011/0153903 A1 | 6/2011 | Hinkle |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0239083 A1 | 9/2011 | Kanno |
| 2011/0252188 A1 | 10/2011 | Weingarten |
| 2011/0258514 A1 | 10/2011 | Lasser |
| 2011/0292538 A1 | 12/2011 | Haga |
| 2011/0296411 A1 | 12/2011 | Tang |
| 2011/0299317 A1 | 12/2011 | Shaeffer |
| 2011/0302353 A1 | 12/2011 | Confalonieri |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |
| 2012/0147021 A1 | 6/2012 | Cheng |
| 2012/0159099 A1 | 6/2012 | Lindamood |
| 2012/0159289 A1 | 6/2012 | Piccirillo |
| 2012/0173792 A1 | 7/2012 | Lassa |
| 2012/0203958 A1 | 8/2012 | Jones |
| 2012/0210095 A1 | 8/2012 | Nellans |
| 2012/0246392 A1 | 9/2012 | Cheon |
| 2012/0278579 A1 | 11/2012 | Goss |
| 2012/0284587 A1 | 11/2012 | Yu |
| 2012/0331207 A1 | 12/2012 | Lassa |
| 2013/0024605 A1 | 1/2013 | Sharon |
| 2013/0054822 A1 | 2/2013 | Mordani |
| 2013/0061029 A1 | 3/2013 | Huff |

(56) References Cited

U.S. PATENT DOCUMENTS

| | | | |
|---|---|---|---|
| 2013/0073798 A1 | 3/2013 | Kang | |
| 2013/0080391 A1 | 3/2013 | Raichstein | |
| 2013/0145085 A1 | 6/2013 | Yu | |
| 2013/0145089 A1 | 6/2013 | Eleftheriou | |
| 2013/0151759 A1 | 6/2013 | Shim | |
| 2013/0159251 A1 | 6/2013 | Skrenta | |
| 2013/0166820 A1 | 6/2013 | Batwara | |
| 2013/0173845 A1 | 7/2013 | Aslam | |
| 2013/0191601 A1 | 7/2013 | Peterson | |
| 2013/0219131 A1 | 8/2013 | Alexandron | |
| 2013/0238955 A1 | 9/2013 | D Abreu | |
| 2013/0254622 A1 | 9/2013 | Kanno | |
| 2013/0318283 A1 | 11/2013 | Small | |
| 2014/0006688 A1 | 1/2014 | Yu | |
| 2014/0019650 A1 | 1/2014 | Li | |
| 2014/0025638 A1 | 1/2014 | Hu | |
| 2014/0082273 A1 | 3/2014 | Segev | |
| 2014/0095827 A1 | 4/2014 | Wei | |
| 2014/0108414 A1 | 4/2014 | Stillerman | |
| 2014/0181532 A1 | 6/2014 | Camp | |
| 2014/0195564 A1 | 7/2014 | Talagala | |
| 2014/0233950 A1 | 8/2014 | Luo | |
| 2014/0250259 A1 | 9/2014 | Ke | |
| 2014/0279927 A1 | 9/2014 | Constantinescu | |
| 2014/0304452 A1 | 10/2014 | De La Iglesia | |
| 2014/0310574 A1 | 10/2014 | Yu | |
| 2014/0359229 A1 | 12/2014 | Cota-Robles | |
| 2014/0365707 A1 | 12/2014 | Talagala | |
| 2015/0019798 A1 | 1/2015 | Huang | |
| 2015/0082317 A1 | 3/2015 | You | |
| 2015/0106556 A1 | 4/2015 | Yu | |
| 2015/0106559 A1 | 4/2015 | Cho | |
| 2015/0121031 A1 | 4/2015 | Feng | |
| 2015/0142752 A1 | 5/2015 | Chennamsetty | |
| 2015/0199234 A1 | 7/2015 | Choi | |
| 2015/0227316 A1 | 8/2015 | Warfield | |
| 2015/0234845 A1 | 8/2015 | Moore | |
| 2015/0269964 A1 | 9/2015 | Fallone | |
| 2015/0277937 A1 | 10/2015 | Swanson | |
| 2015/0294684 A1 | 10/2015 | Qjang | |
| 2015/0301964 A1 | 10/2015 | Brinicombe | |
| 2015/0304108 A1 | 10/2015 | Obukhov | |
| 2015/0347025 A1* | 12/2015 | Law | G06F 3/0611 711/103 |
| 2015/0363271 A1 | 12/2015 | Haustein | |
| 2015/0363328 A1 | 12/2015 | Candelaria | |
| 2015/0372597 A1 | 12/2015 | Luo | |
| 2016/0014039 A1 | 1/2016 | Reddy | |
| 2016/0026575 A1 | 1/2016 | Samanta | |
| 2016/0041760 A1 | 2/2016 | Kuang | |
| 2016/0048341 A1 | 2/2016 | Constantinescu | |
| 2016/0077749 A1 | 3/2016 | Ravimohan | |
| 2016/0077968 A1 | 3/2016 | Sela | |
| 2016/0098344 A1 | 4/2016 | Gorobets | |
| 2016/0098350 A1 | 4/2016 | Tang | |
| 2016/0103631 A1* | 4/2016 | Ke | G06F 3/064 711/103 |
| 2016/0110254 A1 | 4/2016 | Cronie | |
| 2016/0154601 A1 | 6/2016 | Chen | |
| 2016/0155750 A1 | 6/2016 | Yasuda | |
| 2016/0162187 A1 | 6/2016 | Lee | |
| 2016/0179399 A1 | 6/2016 | Melik-Martirosian | |
| 2016/0203000 A1 | 7/2016 | Parmar | |
| 2016/0232103 A1 | 8/2016 | Schmisseur | |
| 2016/0234297 A1 | 8/2016 | Ambach | |
| 2016/0239074 A1 | 8/2016 | Lee | |
| 2016/0239380 A1 | 8/2016 | Wideman | |
| 2016/0274636 A1 | 9/2016 | Kim | |
| 2016/0306853 A1 | 10/2016 | Sabaa | |
| 2016/0321002 A1 | 11/2016 | Jung | |
| 2016/0342345 A1 | 11/2016 | Kankani | |
| 2016/0343429 A1 | 11/2016 | Nieuwejaar | |
| 2016/0350002 A1 | 12/2016 | Vergis | |
| 2016/0350385 A1 | 12/2016 | Poder | |
| 2016/0364146 A1 | 12/2016 | Kuttner | |
| 2017/0010652 A1 | 1/2017 | Huang | |
| 2017/0075583 A1 | 3/2017 | Alexander | |
| 2017/0075594 A1 | 3/2017 | Badam | |
| 2017/0091110 A1* | 3/2017 | Ash | G06F 12/0868 |
| 2017/0109199 A1 | 4/2017 | Chen | |
| 2017/0109232 A1 | 4/2017 | Cha | |
| 2017/0147499 A1 | 5/2017 | Mohan | |
| 2017/0161202 A1 | 6/2017 | Erez | |
| 2017/0162235 A1 | 6/2017 | De | |
| 2017/0168986 A1 | 6/2017 | Sajeepa | |
| 2017/0177217 A1 | 6/2017 | Kanno | |
| 2017/0177259 A1 | 6/2017 | Motwani | |
| 2017/0199823 A1 | 7/2017 | Hayes | |
| 2017/0212708 A1 | 7/2017 | Suhas | |
| 2017/0220254 A1 | 8/2017 | Warfield | |
| 2017/0221519 A1 | 8/2017 | Matsuo | |
| 2017/0228157 A1 | 8/2017 | Yang | |
| 2017/0242722 A1 | 8/2017 | Qiu | |
| 2017/0249162 A1 | 8/2017 | Tsirkin | |
| 2017/0262178 A1 | 9/2017 | Hashimoto | |
| 2017/0262217 A1 | 9/2017 | Pradhan | |
| 2017/0269998 A1 | 9/2017 | Sunwoo | |
| 2017/0285976 A1 | 10/2017 | Durham | |
| 2017/0286311 A1 | 10/2017 | Juenemann | |
| 2017/0322888 A1 | 11/2017 | Booth | |
| 2017/0344470 A1 | 11/2017 | Yang | |
| 2017/0344491 A1 | 11/2017 | Pandurangan | |
| 2017/0353576 A1 | 12/2017 | Guim Bernat | |
| 2018/0024772 A1 | 1/2018 | Madraswala | |
| 2018/0024779 A1 | 1/2018 | Kojima | |
| 2018/0033491 A1 | 2/2018 | Marelli | |
| 2018/0052797 A1 | 2/2018 | Barzik | |
| 2018/0067847 A1 | 3/2018 | Oh | |
| 2018/0074730 A1 | 3/2018 | Inoue | |
| 2018/0076828 A1 | 3/2018 | Kanno | |
| 2018/0088867 A1 | 3/2018 | Kaminaga | |
| 2018/0107591 A1 | 4/2018 | Smith | |
| 2018/0143780 A1 | 5/2018 | Cho | |
| 2018/0165038 A1 | 6/2018 | Authement | |
| 2018/0167268 A1 | 6/2018 | Liguori | |
| 2018/0173620 A1 | 6/2018 | Cen | |
| 2018/0188970 A1 | 7/2018 | Liu | |
| 2018/0189182 A1 | 7/2018 | Wang | |
| 2018/0212951 A1 | 7/2018 | Goodrum | |
| 2018/0226124 A1 | 8/2018 | Perner | |
| 2018/0232151 A1 | 8/2018 | Badam | |
| 2018/0270110 A1 | 9/2018 | Chugtu | |
| 2018/0293014 A1 | 10/2018 | Ravimohan | |
| 2018/0300203 A1 | 10/2018 | Kathpal | |
| 2018/0329776 A1 | 11/2018 | Lai | |
| 2018/0336921 A1 | 11/2018 | Ryun | |
| 2018/0356992 A1 | 12/2018 | Lamberts | |
| 2018/0373428 A1 | 12/2018 | Kan | |
| 2018/0373655 A1 | 12/2018 | Liu | |
| 2018/0373664 A1 | 12/2018 | Vijayrao | |
| 2019/0012111 A1 | 1/2019 | Li | |
| 2019/0065085 A1 | 2/2019 | Jean | |
| 2019/0073262 A1 | 3/2019 | Chen | |
| 2019/0087115 A1 | 3/2019 | Li | |
| 2019/0087328 A1 | 3/2019 | Kanno | |
| 2019/0171532 A1 | 6/2019 | Abadi | |
| 2019/0205206 A1 | 7/2019 | Hornung | |
| 2019/0227927 A1* | 7/2019 | Miao | G06F 3/0679 |
| 2019/0272242 A1 | 9/2019 | Kachare | |
| 2019/0278654 A1 | 9/2019 | Kaynak | |
| 2019/0339998 A1 | 11/2019 | Momchilov | |
| 2019/0377632 A1 | 12/2019 | Oh | |
| 2019/0377821 A1 | 12/2019 | Pleshachkov | |
| 2019/0391748 A1 | 12/2019 | Li | |
| 2020/0004456 A1 | 1/2020 | Williams | |
| 2020/0004674 A1 | 1/2020 | Williams | |
| 2020/0013458 A1 | 1/2020 | Schreck | |
| 2020/0042223 A1 | 2/2020 | Li | |
| 2020/0097189 A1 | 3/2020 | Tao | |
| 2020/0159425 A1 | 5/2020 | Flynn | |
| 2020/0167091 A1 | 5/2020 | Haridas | |
| 2020/0348888 A1 | 11/2020 | Kim | |

(56) References Cited

U.S. PATENT DOCUMENTS

FOREIGN PATENT DOCUMENTS

| WO | 9418634 | 8/1994 |
|---|---|---|
| WO | 1994018634 | 8/1994 |

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

EMC Powerpath Load Balancing and Failover Comparison with native MPIO operating system solutions. Feb. 2011.

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Jimenex, X., Novo, D. and P. Ienne, "Pheonix:Reviving MLC Blocks as SLC to Extend NAND Flash Devices Lifetime," Design, Automation & Text in Europe Conference & Exhibition (Date), 2013.

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices" < FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

C. Wu, D. Wu, H. Chou and C. Cheng, "Rethink the Design of Flash Translation Layers in a Component-Based View", in IEEE Acess, vol. 5, pp. 12895-12912, 2017.

Po-Liang Wu, Yuan-Hao Chang and T. Kuo, "A file-system-aware FTL design for flash-memory storage systems," 2009, pp. 393-398.

S. Choudhuri and T. Givargis, "Preformance improvement of block based NAND flash translation layer", 2007 5th IEEE/ACM/IFIP International Conference on Hardware/Software Codesign and Systems Synthesis (CODES+ISSS). Salzburg, 2007, pp. 257-262.

A. Zuck, O. Kishon and S. Toledo. "LSDM: Improving the Preformance of Mobile Storage with a Log-Structured Address Remapping Device Driver", 2014 Eighth International Conference on Next Generation Mobile Apps, Services and Technologies, Oxford, 2014, pp. 221-228.

J. Jung and Y. Won, "nvramdisk: A Transactional Block Device Driver for Non-Volatile RAM", in IEEE Transactions on Computers, vol. 65, No. 2, pp. 589-600, Feb. 1, 2016.

\* cited by examiner

METHOD AND SYSTEM FOR FACILITATING ATOMICITY AND LATENCY ASSURANCE ON VARIABLE SIZED I/O

RELATED APPLICATION

This application claims the benefit of U.S. Provisional Application No. 62/713,921, titled "Method of System Atomicity Enforcement and Access Latency Assurance on Randomly Variable I/O Size," by inventor Shu Li, filed 2 Aug. 2018, the disclosure of which is incorporated herein by reference in its entirety.

BACKGROUND

Field

This disclosure is generally related to the field of data storage. More specifically, this disclosure is related to a method and system for facilitating atomicity and latency assurance on variably sized input/output (I/O) requests.

Related Art

The proliferation of the Internet and e-commerce continues to create a vast amount of digital content. Various storage systems and servers have been created to access and store such digital content. In cloud or clustered storage systems, multiple applications may share the underlying system resources (e.g., of a storage device). Managing the resources of a storage device is critical both for the performance of the system and to satisfy any Quality of Service (QoS) requirements. Current applications may require writing data in a size which does not align with a physical unit size of the physical media ("variably sized data" or "variably sized I/O"). For example, data written to a hard disk drive (HDD) may be part of a host I/O of a size which does not align with a physical sector of the HDD. In such cases, any data which does not fit onto a current sector is split across two different physical sectors, e.g., with a first portion of the I/O written to a first page, and a second portion of the I/O appended with zeroes and written to a second page. Because HDDs support in-place overwrites, subsequent data can be written directly after the end of the previous I/O, after retrieving the second portion and dropping the zeroes, without losing much in terms of latency.

However, in an SSD, which does not support in-place overwrites, writing variably sized data in this manner (e.g., splitting it across two different physical pages) can result in several inefficiencies. Instead of the in-place overwrites of the HDD, subsequent data can only be written in the SSD by retrieving the second portion of the previous I/O appended with zeros from an original physical page, dropping the zeros, appending the first portion of the next I/O, and writing that new portion (with the second portion of the previous I/O and the first portion of the next I/O) to a new physical page. This can result in an increased write amplification, as well as a large number of "partial" pages, i.e., pages with both valid data and invalid data. The large number of partial pages can trigger a more frequent garbage collection process, which can reduce the performance of the SSD and increase the wear out of its NAND flash. Additionally, this manner of writing variably sized data in an SSD can result in a decreased amount of space for user storage.

Thus, while HDDs which allow for in-place overwrites can write variably sized I/O across different physical sectors, several challenges remain in writing variably sized I/O in SSDs, which do not support in-place overwrites.

SUMMARY

One embodiment facilitates data storage. During operation, the system selects a first page of a non-volatile storage to be recycled in a garbage collection process. The system determines that the first page is a first partial page which includes valid data and invalid data. The system combines the valid data from the first partial page with valid data from a second partial page to form a first full page, wherein a full page is aligned with a physical page in the non-volatile storage. The system writes the first full page to a first newly assigned physical page of the non-volatile storage.

In some embodiments, the first partial page further includes a noisy parity corresponding to the valid data and the invalid data. The system detects a setting which allows noise in the garbage collection process. The system reads the valid data from the first partial page. The system reads the valid data from the second partial page, wherein the valid data from the second partial page corresponds to a second partial parity. The system accumulates the second partial parity with the noisy parity.

In some embodiments, the system sends the read valid data and the noisy parity from the first partial page to a parity accumulation module. The system determines the valid data from the second partial page. The system aligns the valid data from the second partial page by padding with zeros. The system encodes the valid data from the second partial page to obtain the second partial parity, wherein the second partial parity and the noisy parity are accumulated by the parity accumulation module.

In some embodiments, the valid data from the second partial page is associated with a host write operation, a background write process, or a garbage collection process.

In some embodiments, in response to determining that the first page is a second full page which is filled with valid data: the system reads the valid data from the second full page; the system transfers the read data to a page buffer of a NAND plane of a second newly assigned physical page; and the system writes the transferred data to the second newly assigned physical page.

In some embodiments, in response to detecting a setting which does not allow noise in the garbage collection process: the system reads all data from a second page to be recycled; and the system performs on the second page, a decoding and an encoding based on an error correction code (ECC).

In some embodiments, in response to determining that the second page is a second full page which is filled with valid data: the system reads raw data from the second full page; the system decodes the read raw data based on the ECC to obtain ECC-decoded data; the system encodes the ECC-decoded data based on the ECC to obtain ECC-encoded data; the system transfers the ECC-encoded data to a page buffer of a NAND plane of a second newly assigned physical page; and the system writes the transferred data to the second newly assigned page.

In some embodiments, in response to determining that the second page is a third partial page which includes valid data, empty space, and a third partial parity corresponding to the valid data in the third partial page: the system reads raw data from the third partial page; the system aligns the read data from the third partial page by padding with zeros; the system decodes the read data from the third partial page based on the ECC to obtain ECC-decoded data; the system encodes the ECC-decoded data based on the ECC to obtain ECC-encoded data, which includes an updated third partial parity; the system sends sending the ECC-encoded data of the third partial page to a parity accumulation module; the system combines valid data from the third partial page with valid data from a fourth partial page to form a third full page, wherein the valid data from the fourth partial page corresponds to a fourth partial parity; the system accumulates, by the parity accumulation module, the fourth partial parity with the updated third partial parity; the system transfers data in the third full page to a page buffer of a NAND plane of a second newly assigned page of the non-volatile memory; and the system writes the transferred data to the second newly assigned physical page.

BRIEF DESCRIPTION OF THE FIGURES

In the figures, like reference numerals refer to the same figure elements.

DETAILED DESCRIPTION

Figure 1:
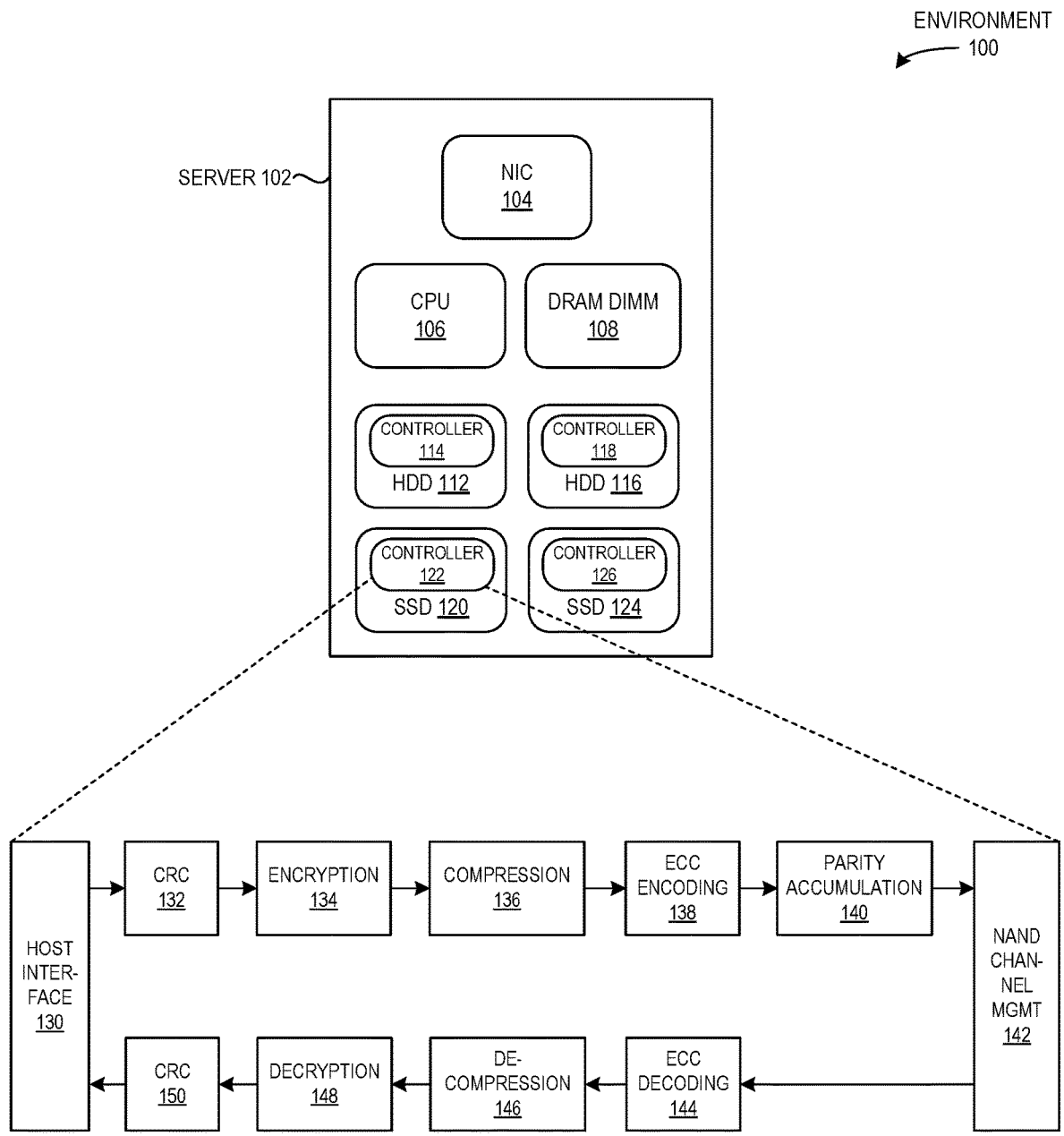
FIG. 1 illustrates an exemplary environment that facilitates data storage, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein provide a system which solves the problem of ensuring both atomicity and latency in handling variably sized I/O requests. As discussed above, current applications may require writing data in a size which does not align with a physical unit size of the physical media ("variably sized data" or "variably sized I/O"). For example, data written to an HDD may be part of a host I/O of a size which does not align with a physical sector of the HDD. In such cases, any data which does not fit onto a current sector is split across two different physical sectors, e.g., with a first portion of the I/O written to a first page, and a second portion of the I/O appended with zeroes and written to a second page. Because HDDs support in-place overwrites, subsequent data can be written directly after the end of the previous I/O, after retrieving the second portion and dropping the zeroes, without losing much in terms of latency.

However, in an SSD, which does not support in-place overwrites, writing variably sized data in this manner (e.g., splitting it across two different physical pages) can result in several inefficiencies. Instead of the in-place overwrites of the HDD, subsequent data can only be written in the SSD by retrieving the second portion of the previous I/O appended with zeros from an original physical page, dropping the zeros, appending the first portion of the next I/O, and writing that new portion (with the second portion of the previous I/O and the first portion of the next I/O) to a new physical page. This can result in an increased write amplification, as well as a large number of "partial" pages, i.e., pages with both valid data and invalid data. The large number of partial pages can trigger a more frequent garbage collection process, which can reduce the performance of the SSD and increase the wear out of its NAND flash. Additionally, this manner of writing variably sized data in an SSD can result in a decreased amount of space for user storage.

The embodiments described herein address these challenges by providing a system which compresses variably sized data for placement onto a new physical page, rather than splitting the variably sized I/O across two separate pages. By reducing the number of pages involved (from two pages to one page), the system can ensure atomicity in a transaction, which can improve the latency involved in both writing and subsequently accessing the variably sized I/O, as described below in relation to FIG. 3B.

Furthermore, the embodiments described herein utilize a parity accumulation module, which can store an incremental parity corresponding to valid data from multiple partial pages, and can further accumulate these multiple incremental parities with corresponding valid data to form a full page which aligns with a physical page of non-volatile memory (e.g., the NAND flash of an SSD). By writing an entire full page in this manner, the embodiments described herein can reduce the write amplification involved in data storage, as described below in relation to FIGS. 4 and 7. The embodiments described herein can additionally process data to be recycled by allowing a "noisy" garbage collection process while avoiding the expense of encoding/decoding based on an error correction code (ECC), as described below in relation to FIGS. 5, 6A, and 6B.

Thus, the embodiments described herein provide a system which improves and enhances the efficiency and performance of a storage system. By utilizing compression, placing incoming I/O in a new physical page rather than splitting across two pages, accumulating parity to fill and write an entire full page at a time, and employing a noisy garbage collection, the system provides the improvements and enhancements in several ways. First, the system can provide a reduced write amplification, which can result in an increase in the lifespan of the NAND of the SSD. Second, the system can trigger the garbage collection less frequently than in conventional systems, which can result in an increased performance in the SSD. Third, the system can optimize the utilization of the space more efficiently, which can provide an increased capacity for user storage. These benefits result in an improved and more efficient storage system.

The term "atomicity" refers to a feature in which each transaction is an indivisible and irreducible series of operations, such that either everything in the transaction occurs, or nothing in the transaction occurs. The term "atomicity assurance" refers to ensuring that such a transaction is executed in a way which guarantees the atomicity or indivisibility of the transaction. The term "latency assurance" refers to ensuring that the latency of an I/O request meets a predetermined threshold, which can be defined in a service-level agreement (SLA), based on a QoS requirement, or other requirement.

The terms "storage device" and "storage drive" refers to a device or a drive with physical media to which data can be written or stored. An example of a storage device is a solid state drive (SSD) which has a non-volatile memory such as Not-And (NAND) flash storage. The term "storage system" refers to a device or system which has one or more storage devices or drives.

The term "partial page" refers to a page which includes both valid data and invalid data. The term "full page" refers to a page which is full of valid data.

Figure 5:
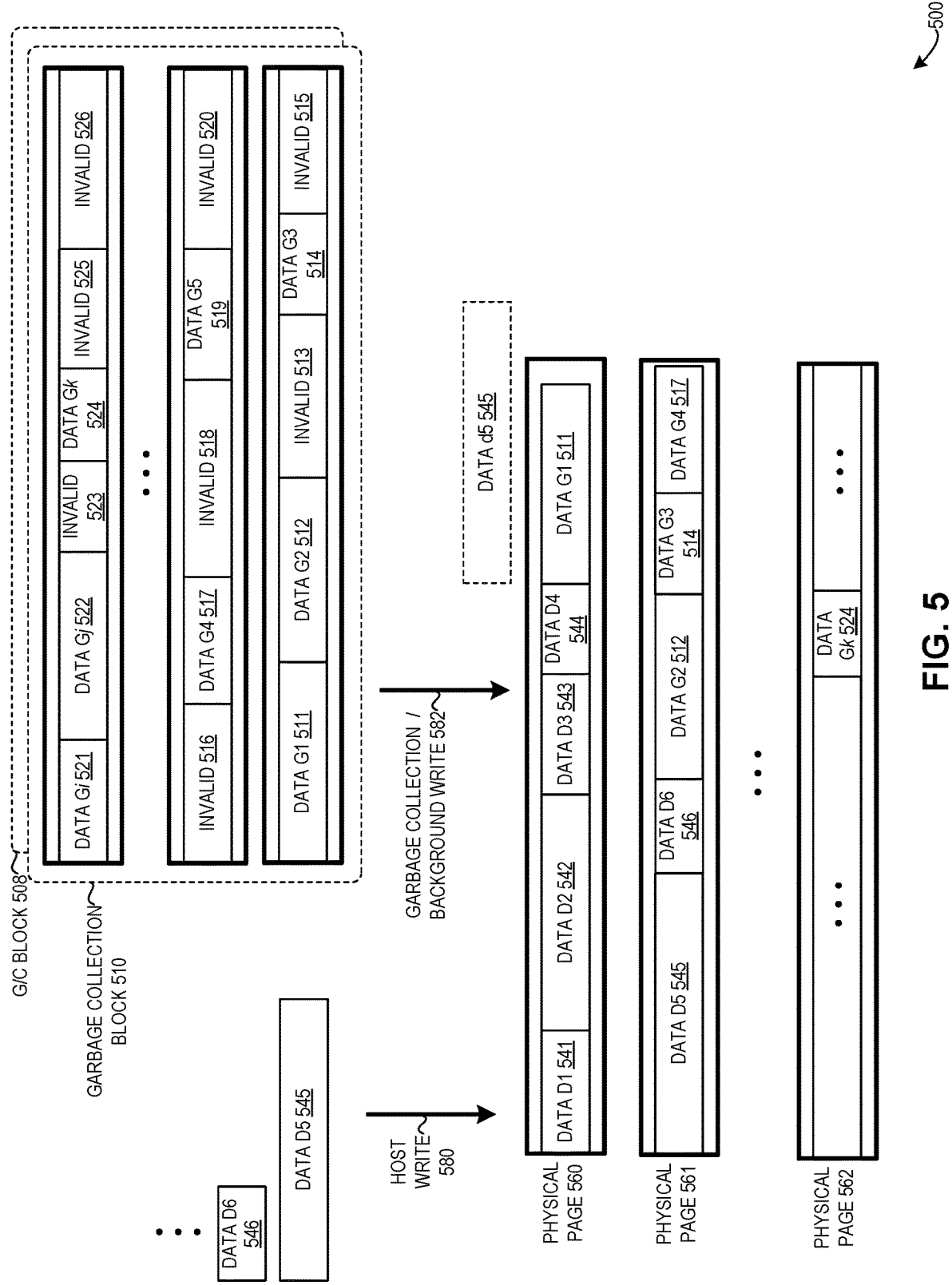
FIG. 5 presents an environment that facilitates data storage, including handling data from a host write operation and a garbage collection or background write process, in accordance with an embodiment of the present application.
Figure 6A:
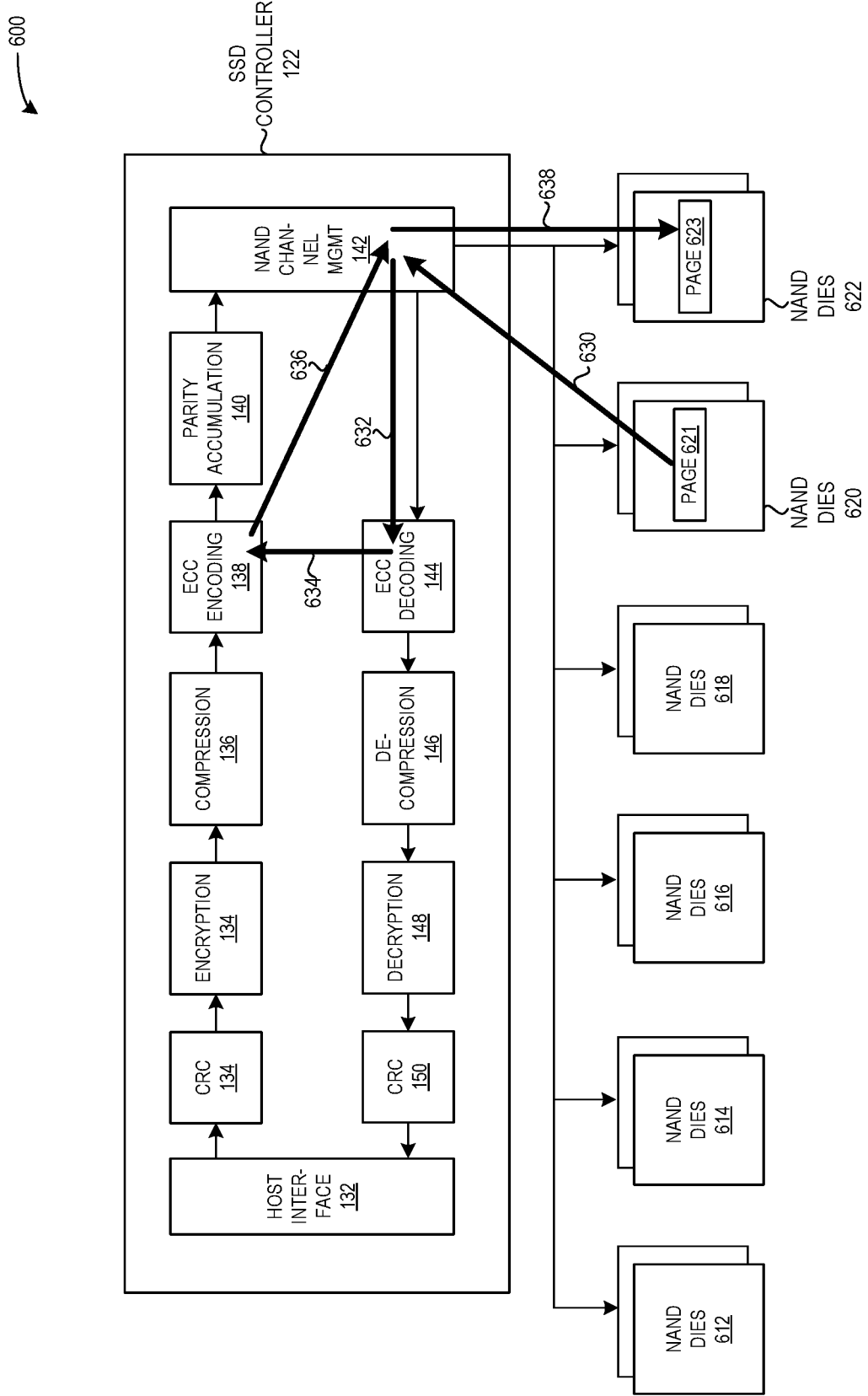
FIG. 6A presents an exemplary architecture of a solid state drive, including ECC encoding/decoding on a full page during garbage collection, in accordance with an embodiment of the present application.
Figure 6B:
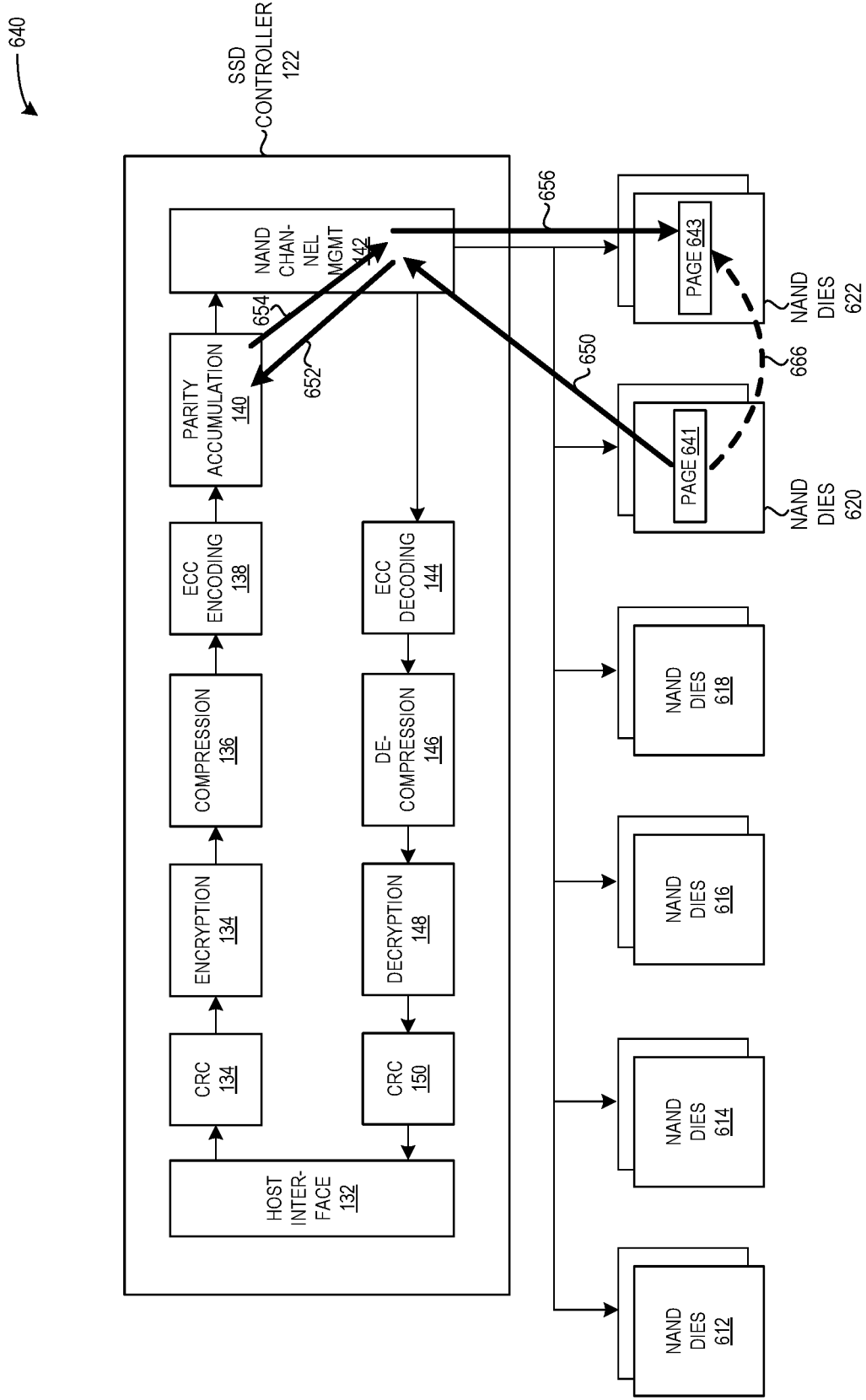
FIG. 6B presents an exemplary architecture of a solid state drive, including a parity accumulation module which eliminates ECC encoding/decoding on a partial page during garbage collection, in accordance with an embodiment of the present application.

The term "parity accumulation module" refers to a unit, component, or module which can perform the operations described herein, including in relation to FIGS. 5 and 6B.

The term "partial parity" refers to a parity which corresponds to a portion of data stored in a respective and corresponding physical page.

The term "incremental parity" refers to a parity which corresponds to valid data from multiple partial pages. In this disclosure, the parity accumulation module can accumulate multiple incremental parities and partial parities with their corresponding valid data to form a full page which aligns with a physical page of the non-volatile memory.

Exemplary Environment and Network

FIG. 1 illustrates an exemplary environment 100 that facilitates data storage, in accordance with an embodiment of the present application. Environment 100 can include a server 102, which can be a storage device or a computing device with multiple storage drives. Each storage drive, such as a solid state drive (SSD) or a hard disk drive (HDD), can include a controller and multiple physical media for data storage. For example, an SSD can include NAND physical media for storage, and an HDD can include physical media with multiple tracks for storage. Server 102 can communicate via a network with a client computing device (not shown). Server 102 can also be a part of distributed storage system which can include multiple storage servers in communication with multiple client servers (not shown).

Server 102 can include: a network interface card (NIC) 104; a central processing unit (CPU) 106; a dynamic random access memory dual in-line memory module (DRAM DIMM) 108; hard disk drives (HDDs) 112 and 116 (with, respectively, controllers 114 and 118); and solid state drives (SSDs) 120 and 124 (with, respectively, controllers 122 and 126).

A controller can include interfaces to a host and to a non-volatile memory, as well as modules for processing data. For example, in SSD 120, SSD controller 122 can include: a host interface 130; a cyclic redundancy check (CRC) module 132; an encryption module 134; a compression module 136; an error correction (ECC) encoding module 138; a parity accumulation module 140; a NAND channel management interface 142; an ECC decoding module 144; a decompression module 146; a decryption module 148; and a CRC module 150. During operation, the SSD controller can process data to be stored via host interface 130. The data can be compressed, which can improve the efficiency of the storage capacity in the SSD, as described below in relation to FIG. 3A. Furthermore, the system can keep together variably sized I/O by storing the variably sized I/O in a new physical page, rather than splitting the variably sized I/O across two separate pages. This can ensure atomicity in a transaction and can further improve the latency (for both writing and subsequently accessing the variably sized I/O) by reducing the number of pages involved from two pages to one page, as described below in relation to FIG. 3B.

Parity accumulation module 140 can store an incremental parity corresponding to valid data from multiple partial pages, and can accumulate these multiple incremental parities with its corresponding valid data to form a full page, which aligns with a physical page of the non-volatile memory, e.g., the NAND flash of the SSD. Parity accumulation module 140 can send a formed full page to NAND channel management interface 142. By writing an entire full page in this manner, the embodiments described herein result in reducing the write amplification involved in data storage, which in turn results in an improved and more efficient overall storage system. Operations relating to parity accumulation module 140 are described below in relation to FIGS. 4 and 7.

The system can also process data to be recycled in a "noisy" garbage collection process which involves both parity accumulation module 140 and NAND channel management module 142, while avoiding ECC encoding/decoding (by ECC encoding module 138 and ECC decoding module 144), as described below in relation to FIGS. 5, 6A, and 6B.

Data Storage of Variably Sized I/O in the Prior Art

Figure 2:
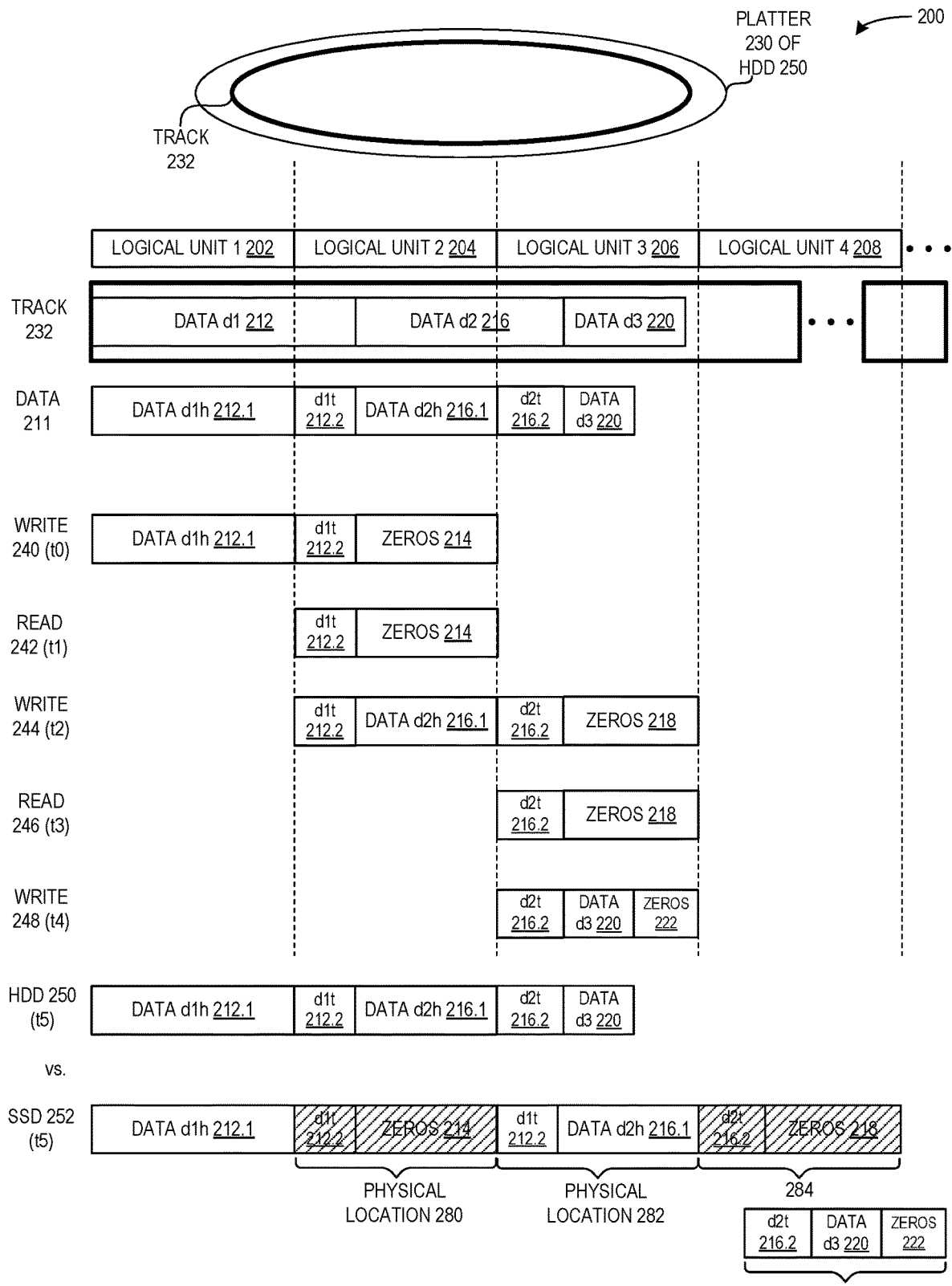
FIG. 2 illustrates an exemplary environment that facilitates data storage, in accordance with the prior art.

FIG. 2 illustrates an exemplary environment 200 that facilitates data storage, in accordance with the prior art.

Environment 200 can include a hard disk drive (HDD) 250 with a platter 230, which can include multiple tracks, such as a track 232. Track 232 can include physical portions corresponding to logical units or sectors, including a logical unit 1 202, a logical unit 2 204, a logical unit 3 206, and a logical unit 4 208. Track 232 can include data from variably sized I/O (e.g., data d1 212, data d2 216, and data d3 220), which is written to track 232 using a process with a high write amplification, as described below. Data can be written to HDD 250 (and to track 232) using an in-place overwrite.

For example, at a time t0, the system can perform a write operation 240 across physical portions corresponding to two logical units of track 232: 1) a first portion of the data d1 212 (i.e., data d1h 212.1) is written to the physical portion corresponding to logical unit 1 202; and 2) a second portion of the data d1 212 (i.e., data d1t 212.2) is appended with zeros 214, and is written to the physical portion corresponding to logical unit 2 204.

Subsequently, in order to write data d2 216 at a time t1, the system can perform a read operation 242 to obtain d1t 212.2 and zeroes 214, and drop zeroes 214. At a time t2, the system can perform a write operation 244, again across physical portions corresponding to two logical units of tracks 232: 1) a first portion of data d2 216 (i.e., data d2h 216.1) is appended to d1t 212.2 in the physical portion corresponding to logical unit 2 204; and 2) a second portion of the data d2 216 (i.e., data d2t 216.2) is appended with zeros 218, and is written to the physical portion corresponding to logical unit 3 206.

Subsequently, in order to write data d3 220 at a time t3, the system can perform a read operation 246 to obtain d2t 216.2 and zeroes 218, and drop zeroes 218. At a time t4, the system can perform a write operation 248, across a physical portion corresponding to a logical unit of tracks 232: 1) all of data d3 220 is appended to d2t 216.2 in the physical portion corresponding to logical unit 204; and 2) because data d3 220 is a variably sized I/O which does not align with a physical sector corresponding to a logical unit of track 232, the system can append zeroes 222 to form a full page of data, and write data d2t 216.2, data d3 220, and zeros 222 to a physical portion corresponding to logical unit 3 206.

Thus, at a time t5, track 232 of platter 230 of HDD 250 can include data which has been written based on the in-place overwrite, resulting in: data d1h 212.1, d1t 212.2, data d2h 216.1, d2t 216.2, and data 3 220.

However, writing data to an SSD using the above manner of placing data across multiple pages results in several inefficiencies because an SSD does not support the in-place overwrite. Data which is read out from an original physical location for subsequent appending of new data is written to a new physical location, resulting in several shortcomings. For example, in an SSD, instead of performing the read operation 242 and the subsequent write operation 244, an SSD controller performs a read operation to read d1t 212.2 and zeroes 214 from a first (original) physical location 280, and then performs a subsequent write operation to write data d1t 212.2 and data d2h 216.1 to a second physical location 282. Similarly, instead of performing the read operation 246 and the subsequent write operation 248, the SSD controller performs a read operation to read d2t 216.2 and zeroes 218 from a first (original) physical location 284, and then performs a subsequent write operation to write data d2t 216.2, data d3 220, and zeros 222 to a second physical location 286.

As shown in FIG. 2, zero-appending an aligned write for variably sized I/O can result in several fractions or portions of physical pages which must be recycled (e.g., as indicated by the diagonally shaded areas of data in original physical locations 280 and 284), which can create several inefficiencies. First, the significant write amplification can lead to a decreased lifespan for the non-volatile memory and the SSD itself. Second, an increased number of fractions or portions of data to be recycled can result in a frequently triggered garbage collection, which can affect the SSD performance, including an increased wear-leveling. Third, the sub-optimal utilization of space can result in a decreased user capacity for storage.

The embodiments described herein provide a system which addresses these inefficiencies by using compression, placing variably sized I/O in a single page (as opposed to across two separate pages), implementing a parity accumulation module which allows for incremental parity and efficient space utilization, and allowing physical pages to be filled from both host write operations and background write/garbage collection operations.

Figure 3A:
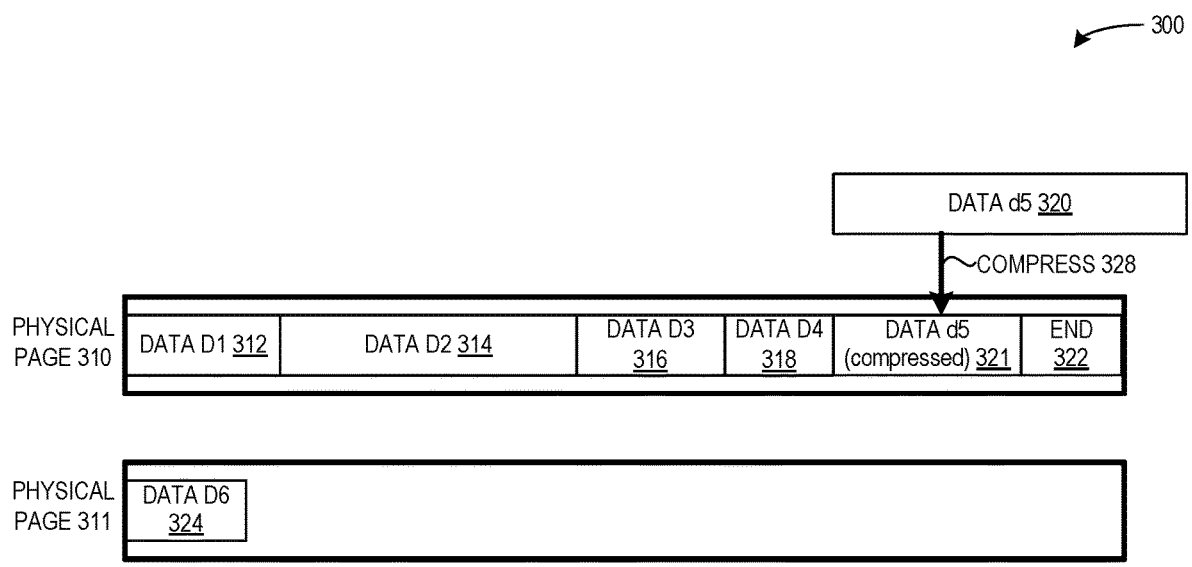
FIG. 3A illustrates an exemplary environment that facilitates data storage, including compression and handling variably sized I/O, in accordance with an embodiment of the present application.

Exemplary Environment for Facilitating Data Storage, Including Compression and Storage of Variably Sized I/O FIG. 3A illustrates an exemplary environment 300 that facilitates data storage, including compression and handling variably sized I/O, in accordance with an embodiment of the present application. Environment 300 can include physical pages 310 and 311. Variably sized I/O can be placed into physical pages 310 and 311 in a sequential manner, e.g., data D1 312, data D2 314, data D3 316, and data D4 318. The system can compress data D5 320 (via a compress operation 328), which results in storing a data D5 (compressed) 321 into physical page 310 after data D4 318, and the system can also store an end data 322, which can include zeros, parity information, or other data. Note that any or all of data D1-D4 can similarly be compressed before being placed into physical page 310. Subsequently, data D6 324 can be placed in physical page 311, etc. Thus, environment 300 illustrates how the system can compress data to more efficiently utilize space in a physical page.

Figure 3B:
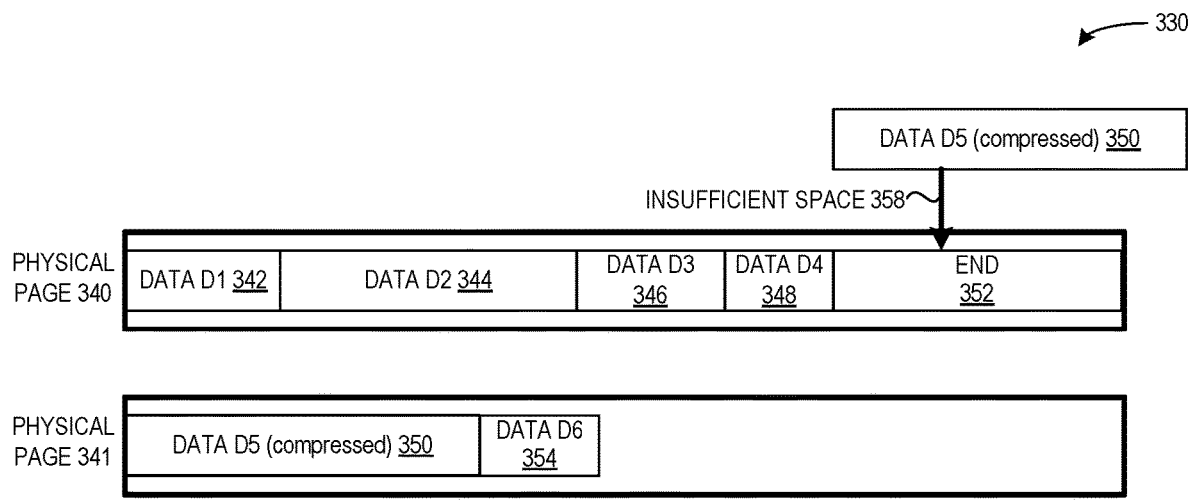
FIG. 3B illustrates an exemplary environment that facilitates data storage, including compression and handling variably sized I/O, in accordance with an embodiment of the present application.

FIG. 3B illustrates an exemplary environment 330 that facilitates data storage, including compression and handling variably sized I/O, in accordance with an embodiment of the present application. Environment 330 can include physical pages 340 and 341. Variably sized I/O can be compressed and placed into physical pages 340 and 341 in a sequential manner, e.g., data D1 342, data D2 344, data D3 346, and data D4 348. The system can compress data D5 (not shown) to obtain data D5 (compressed) 350, and determine that there is insufficient space (via an insufficient space operation 358) in physical page 340 in which to store data D5 (compressed) 350. Instead of splitting data D5 (compressed) 350 across two physical pages, the system can store an end data 352 in physical page 340, and can write the entirety of data D5 (compressed) 350 into physical page 341. Subsequently, data D6 354 can be placed in physical page 341, etc. Thus, environment 300 illustrates how the system can both compress data (e.g., (I/O) and store in a new physical page any variably sized I/O which does not fit into the remaining space of a single physical page. As in environment 300, environment 330 illustrates how the system can more efficiently utilize space in a physical page, which can solve the shortcomings and inefficiencies of the prior art.

The embodiments described herein thus provide a system which: reduces the write amplification, which can lead to an increased lifespan; reduces the number of fractions or portions of data to be recycled, which can result in a less frequently triggered garbage collection and a decreased amount of wear-leveling; and increases the optimization in utilizing the space, which can result in an increased user capacity for storage.

Parity Accumulation

In information theory, a general rule is that the longer the length of an error correction code (ECC) codeword, the stronger the capability of error correction. A typical convention is to divide a single physical page into multiple portions, and encode each portion into ECC codewords. Thus, handling variably sized I/O using the conventional methods can require the use of multiple ECC codewords, which can result in a longer latency due to the longer length of time required to decode the multiple ECC codewords.

Figure 4:
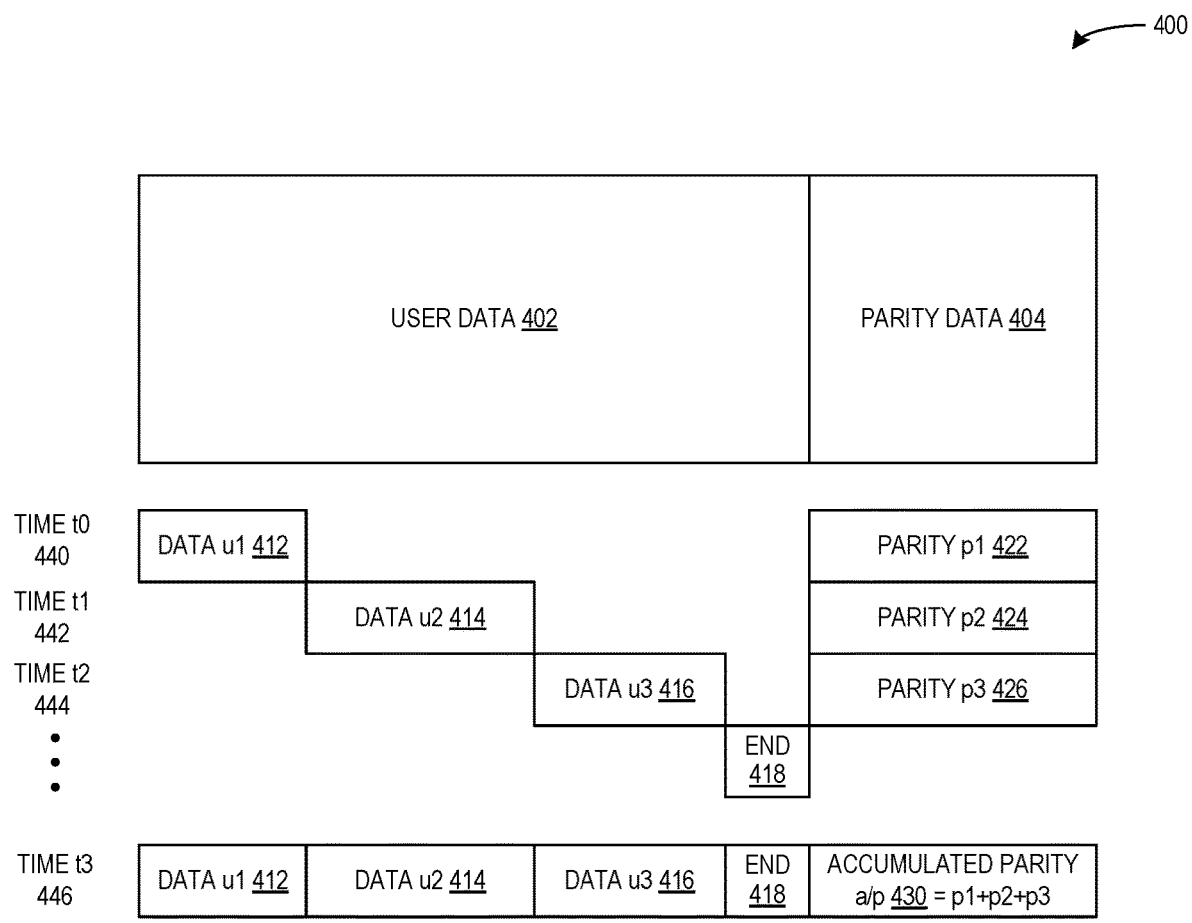
FIG. 4 illustrates an exemplary environment that facilitates data storage, including parity accumulation, in accordance with an embodiment of the present application.

The embodiments described herein address this problem by encoding each physical page into a single ECC codeword, using an accumulated parity. FIG. 4 illustrates an exemplary environment 400 that facilitates data storage, including parity accumulation, in accordance with an embodiment of the present application. Environment 400 indicates a parity check matrix, which can include user data 402 and parity data 404. At a time t0 440, the system can write data u1 412 and its corresponding parity p1 422. At a time t1 442, the system can write data u2 414 and its corresponding parity p2 424. At a time t2 444, the system can write data u3 416 and its corresponding parity p3 426. Subsequently, the system can write an end 418, and can form a full physical page which aligns with a physical page of the non-volatile memory of the SSD. That is, at a time t3 446, the system can form a full physical page which includes: data u1 412; data u2 414; data u3 416; and end data 418; and an accumulated parity ("a/p") 430. Accumulated parity 430 can be calculated or generated by, e.g., parity accumulation module 140 of FIGS. 1, 6A, and 6B, and can include a noisy parity as described below in relation to FIG. 7. That is, accumulated parity 430 can include p1+p2+p3.

Thus, environment 400 depicts how the system can use the parity accumulation module to stop and resume data storage, including appending a variably sized I/O at any arbitrary moment. For example, in environment 400, if data u2 is the last incoming block, the system can generate the corresponding parity p2 and accumulate p2 with current parity p1 (to obtain p1+p2), which can be written to the page to complete the ECC encoding. Because NAND flash is read at the page level, the system can decode the entire ECC codeword to retrieve the user bytes. As a result, fewer parity bits are required, which results in more room for accommodating user bits (e.g., user data 402). Similarly, when data u3 is the last incoming block, the system can generate the corresponding parity p3 and accumulate p3 with the current parity p1+p2 (to obtain p1+p2+p3). By accumulating the parity in this incremental fashion, the system can provide an enhanced ECC and, at the same time, avoid divided blocks of data, which allows for the arbitrary stop and resume on the data storage.

Furthermore, as described above in relation to FIG. 1, the SSD controller can include an internal compression module 136 and an internal decompression module 146. Note that the compression and decompression operations occur in the data path. In conventional systems, compression of data prior to storage can result in an overhead in metadata management when the aligned-size I/O (e.g., data which is aligned to a physical page size, such as 4 kilobytes or 512 bytes) can no longer maintain the same aligned size after compression, resulting in a variably sized I/O. However, because the embodiments described herein specifically account for the variably sized I/O, and the design of the SSD controller and interaction with the NAND memory already handles the variably sized I/O, the overhead caused by the compression in the embodiments described herein is trivial.

Exemplary Real-Time Filling of Pages from Host Write and Garbage Collection Processes Garbage collection is one of the most consuming sources of background write operations. During garbage collection, the system can identify a block to be recycled. Each page in an identified block can include both valid and invalid data. If a respective page to be recycled includes valid data, the system must copy or move that valid data to another location before erasing the identified block (and its constituent pages). The embodiments described below use the background write I/O to fill in empty locations in physical pages of the SSD in order to more efficiently utilize the space of the non-volatile memory of the SSD.

FIG. 5 presents an environment 500 that facilitates data storage, including handling data from a host write operation and a garbage collection or background write process, in accordance with an embodiment of the present application. During operation, the SSD (via its controller) can receive write operations from both incoming host write operations (e.g., a host write 580, which can be a data stream which includes data D5 545 and data D6 546) and background operations (e.g., a garbage collection/background write 582, which can include data from various pages of garbage collection blocks 508 and 510).

The system can process data from host write 580 and background write 582 by placing the received data into physical pages 560, 561, and 562, giving a higher priority to the data received from host write 580. After placing or writing data D1 541, data D2 542, data D3 543, and data D4 544, the system can determine that there is insufficient space to place or write data D5 545 (as shown by the dotted line around data D5 545 above physical page 560), and that there is sufficient space to write data G1 511 from garbage collection block 510. The system can place data G1 511 in physical page 560, and place data D5 545 in another physical page (e.g., physical page 561). The system does not necessarily write data D5 545 after writing data G1 511; indeed, the system can start and finish respectively at different physical pages.

Furthermore, environment 500 depicts that when the host I/O is paused (i.e., when the end of a current data stream from a host I/O is detected), the system can continue to utilize the unused time slot and complete the open pages and open blocks in the non-volatile memory of the SSD by placing the data received via background write 582. For example, if host write 580 is paused or stops after data D6 546, and the system has successfully placed data D6 546 in physical page 561, the system can write data G2 512, data G3 514, and data G4 517 to physical page 561 (and can also write data Gk 524 to physical page 562).

Thus, the embodiments of the system described herein can coordinate a host write stream with background writes to efficiently utilize the usage of the space in the non-volatile memory of the SSD, which improves the performance of the SSD itself as well as the overall storage system.

Three Exemplary Modes of Background Writes in a Solid State Drive; Handling a Variably Sized I/O with Parity Accumulation FIG. 6A presents an exemplary architecture 600 of a solid state drive, including ECC encoding/decoding on a full page during garbage collection, in accordance with an embodiment of the present application. Architecture 600 can include an SSD controller 122 of SSD 120, as described above in relation to FIG. 1. NAND channel management interface 142 can be coupled to the non-volatile memory of SSD 120, such as NAND dies 612, 614, 616, 618, 620, and 622. During operation, the system can perform a garbage collection process by copying out data from an old page 621 (of NAND dies 620) and placing the copied out data into a new page 623 (of NAND dies 622). This process includes several steps. The system reads the raw data (valid data and invalid data) from old page 621 by retrieving the data from NAND dies 620 (by NAND interface 142 via a communication 630). The system sends the read data to ECC decoding module 144 to be ECC-decoded to remove the noise from any invalid data (via a communication 632), then sends the ECC-decoded data to ECC encoding module 138 to be ECC-encoded (via a communication 634). The system then sends the ECC-encoded data to NAND interface 142 (via a communication 636), to be written to new page 623 (via a communication 638).

However, if the identified page of data (e.g., page 621) to be recycled includes valid data and invalid data (e.g., a "partial page"), this means that the data to be recycled does not include the entire ECC codeword. As such, the operations described above (via communications 630-638) are performed on the entire ECC codeword, when in actuality, only a portion of the data associated with the ECC codeword needs to be recycled. This can lead to both an increased latency and write amplification.

Note that the background write depicted in FIG. 6A is to move data from one NAND die to another, with a final goal of placing data in a condition to subsequently read out successfully for host access. Thus, as long as the noise is within a tolerable range (e.g., within a predetermined threshold), it is not necessary to always obtain error-free data for each and every background write. The system can have an indicator of whether noisy garbage collection is on or off, and can detect a condition or a setting which allows noise in the garbage collection process.

FIG. 6B presents an exemplary architecture 640 of a solid state drive, including a parity accumulation module which eliminates ECC encoding/decoding on a partial page during garbage collection, in accordance with an embodiment of the present application. During operation, the system can read out an entire physical page and write that the data from that entire physical page to another physical page. This is a straight-forward direct move which does not involve any error correction, as shown by the dashed line in a communication 666. The system need only update any logical block address (LBA) to physical block address (PBA) mapping in the flash translation layer (FTL).

However, if the system determines that the page to be read out is a partial page (with both valid data and invalid data), the system can recycle only the valid data. Rather than decoding the entire associated codeword for the partial page to be recycled, the system can drop the invalid data, but keep the corresponding parity for the invalid data in the parity. This kept parity can be referred to as the additional parity which results in an overall "noisy" parity for the page. This additional parity which creates the noise can be subsequently removed during error correction on a subsequent operation.

During operation, the system can determine that page 641 is a first partial page which includes valid data, invalid data, and a noisy parity corresponding to the valid data and the invalid data. The system can read the valid data from partial page 621 by retrieving the data and the noisy parity from NAND dies 620 (by NAND interface 142 via a communication 650). The system can send the read valid data with the noisy parity to parity accumulation module 140 (via a communication 652). Parity accumulation module 140 can perform the operations described above in relation to FIG. 4 and described below in relation to FIG. 7. That is, parity accumulation module 140 can: read valid data and its corresponding parity from a second partial page; accumulate the second partial parity with the noisy parity; and combine the valid data from partial page 641 with the valid data from the second partial page, along with the noisy parity, to form a full page, where a full page is aligned with a physical page in the non-volatile memory of the SSD. Parity accumulation module 140 can send the full page to NAND interface 142 (via a communication 654), which can write the full page to new page 643 of NAND dies 622 (via a communication 656).

Figure 7:
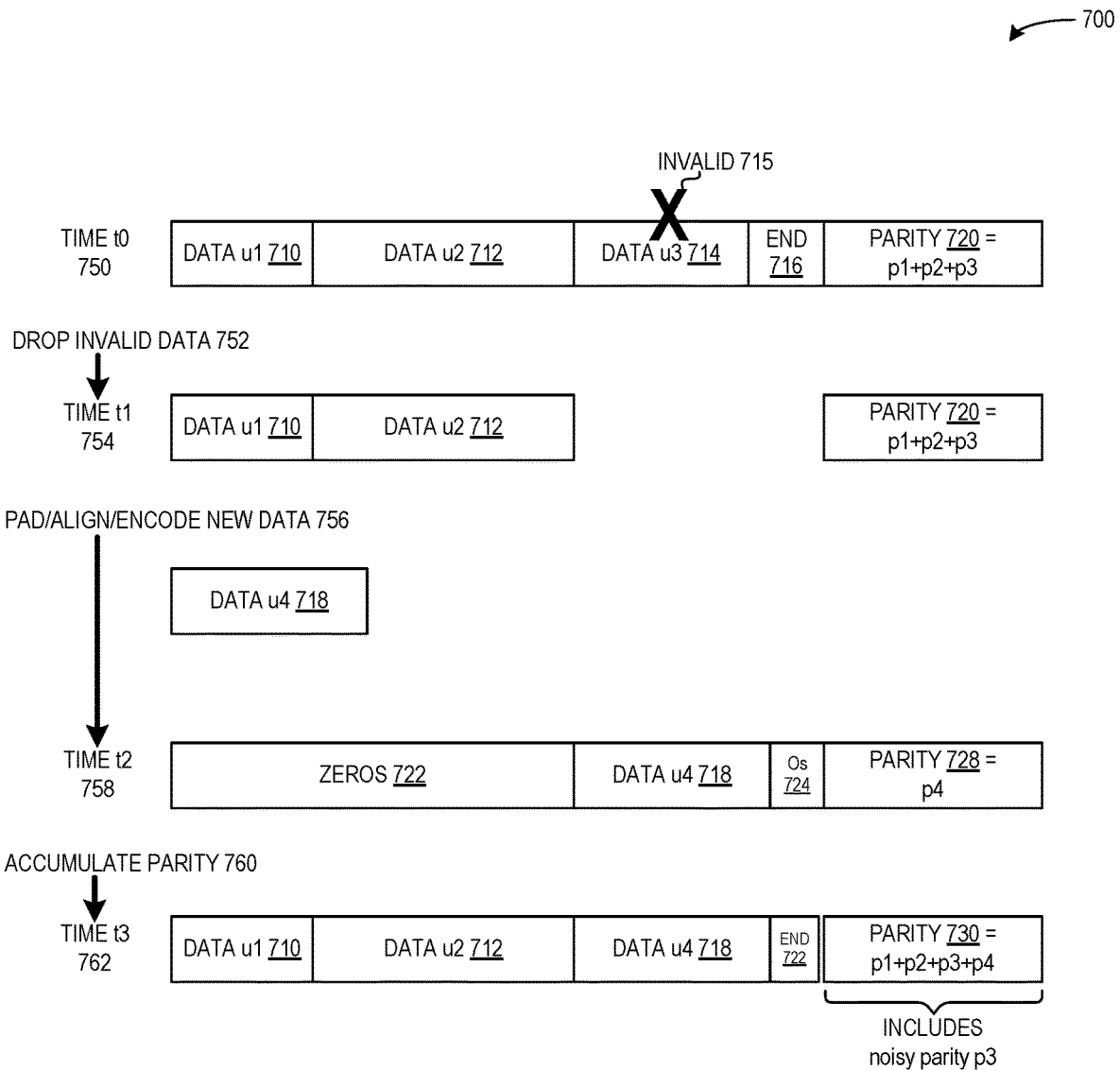
FIG. 7 presents a diagram illustrating an exemplary environment for facilitating data storage, including handling variably sized I/O and parity accumulation, in accordance with an embodiment of the present application.

FIG. 7 presents a diagram illustrating an exemplary environment 700 for facilitating data storage, including handling variably sized I/O and parity accumulation, in accordance with an embodiment of the present application. Environment 700 can include a page of data at a time t0 750. The page can be a partial page which corresponds to partial page 641 described above in relation to FIG. 6B. This partial page can include data u1 710, data u2 712, data u3 714, end data 716, and parity data 720 (which includes p1+p2+p3). Data u3 can be marked as invalid 715. The system can perform a drop invalid data function 752 at a time t1 754. The system can also perform a pad/align/encode new data function 756 on data u4 718 at a time t2 758, which can result in a physical page with zeroes 722, data u4 718, zeros 724, and a parity 728 (which includes p4). The system can subsequently perform an accumulate parity function 760 at a time t3 762, which results in a full physical page which includes: data u1 710; data u2 712; data u4 718; end data 722; and parity 730 (which includes p1+p2+p3+p4). Note that parity 730 is considered a noisy parity because it still includes p3, which is the parity corresponding to the previously dropped invalid data u3 714. The additional noise created by p3 in parity 730 can be removed during a subsequent error correction.

Exemplary Method for Facilitating Data Storage

Figure 8A:
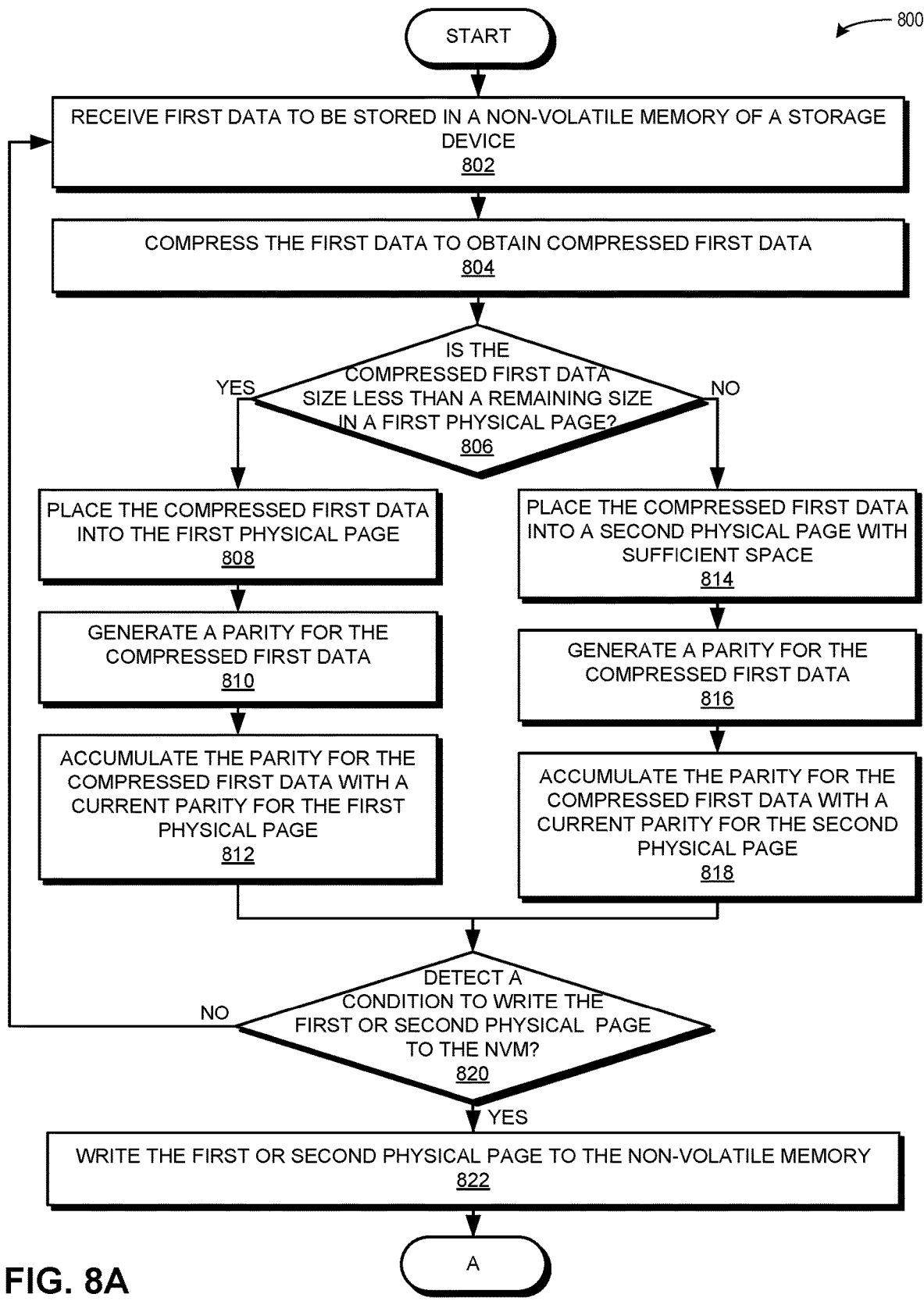
FIG. 8A presents a flowchart illustrating a method for facilitating data storage, in accordance with an embodiment of the present application.

FIG. 8A presents a flowchart illustrating a method 800 for facilitating data storage, in accordance with an embodiment of the present application. During operation, the system receives first data to be stored in a non-volatile memory of a storage device (operation 802). The system processes the first data, including CRC, encryption, compression, ECC encoding, and parity accumulation, as described above. For example, the system compresses the first data to obtained compressed first data (operation 804). If the compressed first data is of a size which is less than a remaining size in a first (or current) physical page (decision 806), the system places the compressed first data into the first physical page (operation 808). The system generates a parity for the compressed first data (operation 810), and accumulates the parity for the compressed first data with a current parity for the first physical page (operation 812). The operation continues at decision 820.

If the compressed first data is of a size which is not less than a remaining size in a first physical page (decision 806), the system places the compressed first data into a second physical page with sufficient space (operation 814). The system generates a parity for the compressed first data (operation 816), and accumulates the parity for the compressed first data with a current parity for the second physical page (operation 818). The operation continues at decision 820.

If the system does not detect a condition to write the first or the second physical page to the non-volatile memory (decision 820), the operation continues at operation 802. If the system does detect a condition to write the first or the second physical page to the non-volatile memory (decision 820), the system writes the data from the first or the second physical page to the non-volatile memory (operation 822), and the operation continues at Label A of FIG. 8B.

Figure 8B:
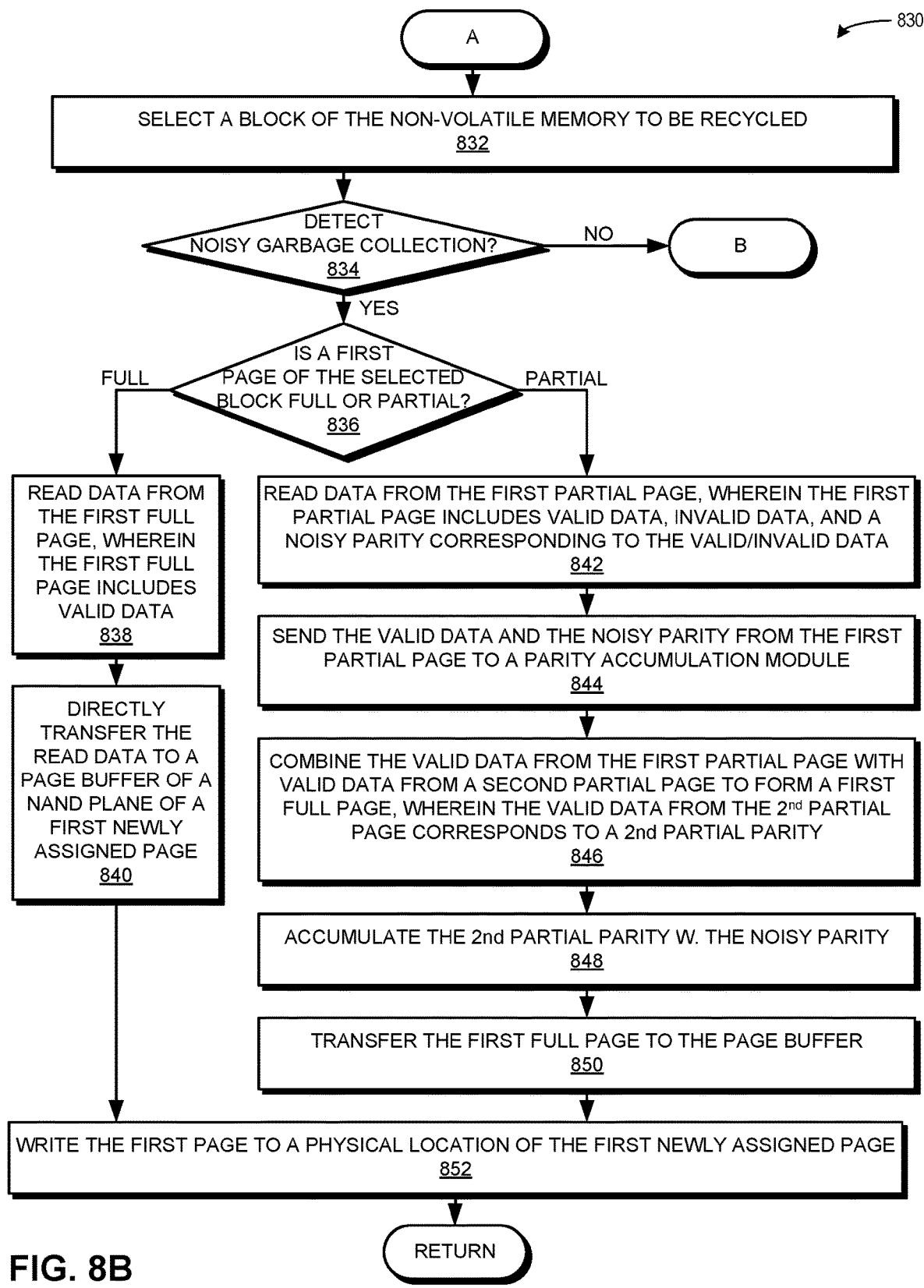
FIG. 8B presents a flowchart illustrating a method for facilitating data storage, in accordance with an embodiment of the present application.

FIG. 8B presents a flowchart 830 illustrating a method for facilitating data storage, in accordance with an embodiment of the present application. During operation, the system selects a block of the non-volatile memory to be recycled (operation 832). The block can include a plurality of pages. If the system does not detect a setting or a condition which allows a noisy garbage collection (decision 834), the operation continues at Label B of FIG. 8C.

If the system does detect a setting or a condition which allows a noisy garbage collection (decision 834), the system determines whether a first page of the selected block is a full or a partial page (decision 836). That is, the system determines if the first page is a full page with valid data, or a partial page with valid data and invalid data. If the first page is a full page (decision 836), the system reads data from the first full page, wherein the first full page includes valid data (and is filled with only valid data) (operation 838). The system directly transfers the read data to a page buffer of a NAND plane of a newly assigned page (operation 840), and writes the transferred data from the first page to a physical location of the newly assigned page (operation 852). The operation returns.

If the first page is a partial page (decision 836), the system reads data from the first partial page, wherein the first partial page includes valid data, invalid data, and a noisy parity corresponding to the valid data and the invalid data (operation 842). The system sends the valid data and the noisy parity from the first partial page to a parity accumulation module (operation 844). The system combines the valid data from the first partial page with valid data from a second partial page to form a first full page, wherein the valid data from the second partial page corresponds to a second partial parity (operation 846). The valid data from the second partial page can be associated with a host write operation or a background write operation, as described above in relation to FIG. 5. The system accumulates, by the parity accumulation module, the second partial parity with the noisy parity (operation 848). The system transfers the data from the first full page to the page buffer of the NAND plane of the newly assigned page (operation 850). That is, the system transfers the combined valid data and the accumulated parity corresponding to the first full page to the page buffer. The system writes the transferred data from the first page to a physical location of the newly assigned page (operation 852). The operation returns.

Figure 8C:
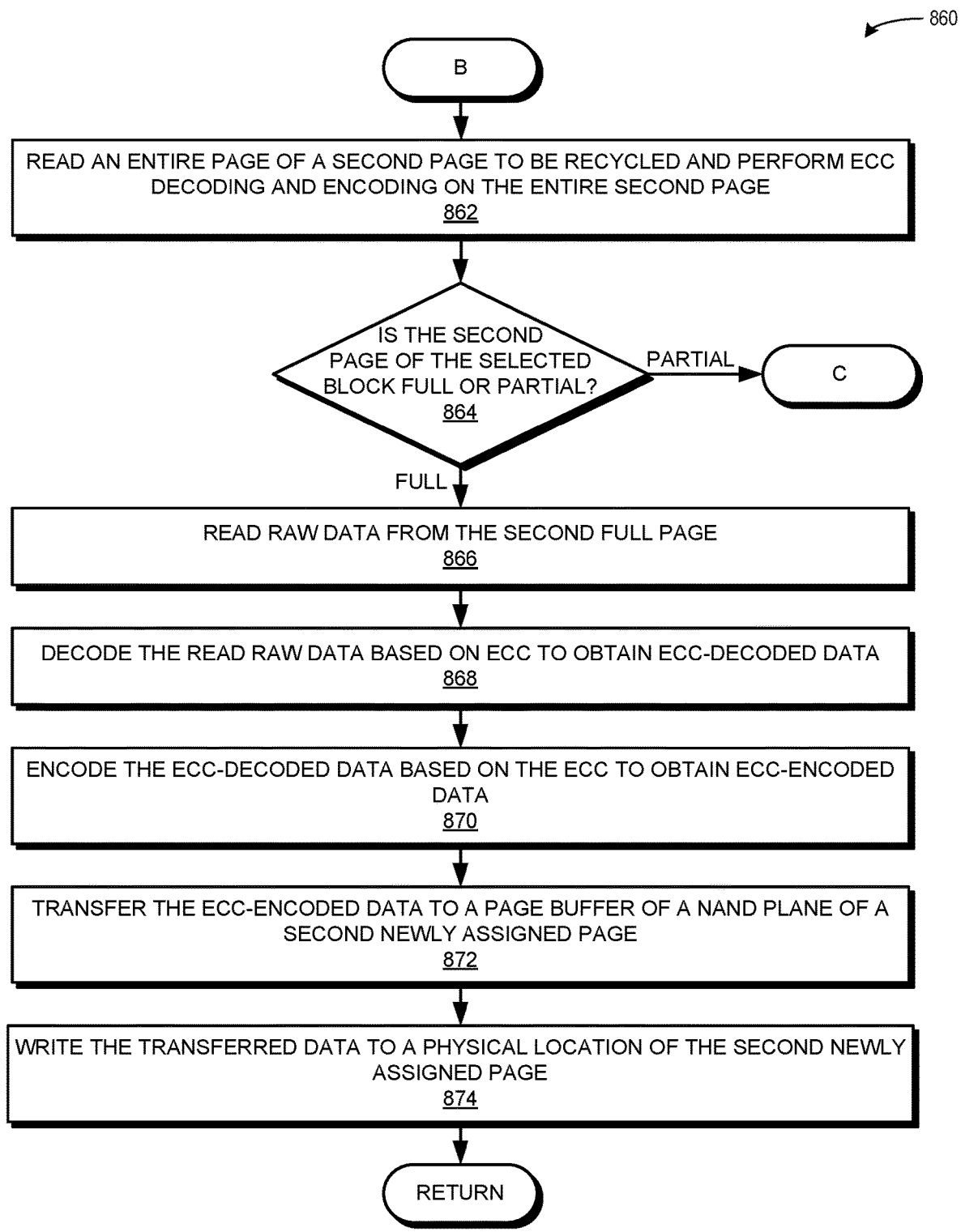
FIG. 8C presents a flowchart illustrating a method for facilitating data storage, in accordance with an embodiment of the present application.

FIG. 8C presents a flowchart 860 illustrating a method for facilitating data storage, in accordance with an embodiment of the present application. During operation, the system reads an entire page of a second page of the selected block to be recycled, and performs ECC decoding and encoding on the entire second page (operation 862), as described above in relation to FIG. 6A. The system determines whether a second page of the selected block is a full or a partial page (decision 864). If the second page of the selected block is a partial page (decision 864), the operation continues at Label C of FIG. 8D.

If the second page of the selected block is a full page (decision 864), the system reads raw data from the second full page (operation 866). The system decodes the read raw data based on ECC to obtain ECC-decoded data (operation 868). The system encodes the ECC-decoded data based on the ECC to obtain ECC-encoded data (operation 870). The system transfers the ECC-encoded data to the page buffer of the NAND plane of a second newly assigned page (operation 872), and writes the transferred data to a physical location of the second newly assigned page (operation 874). The operation returns.

Figure 8D:
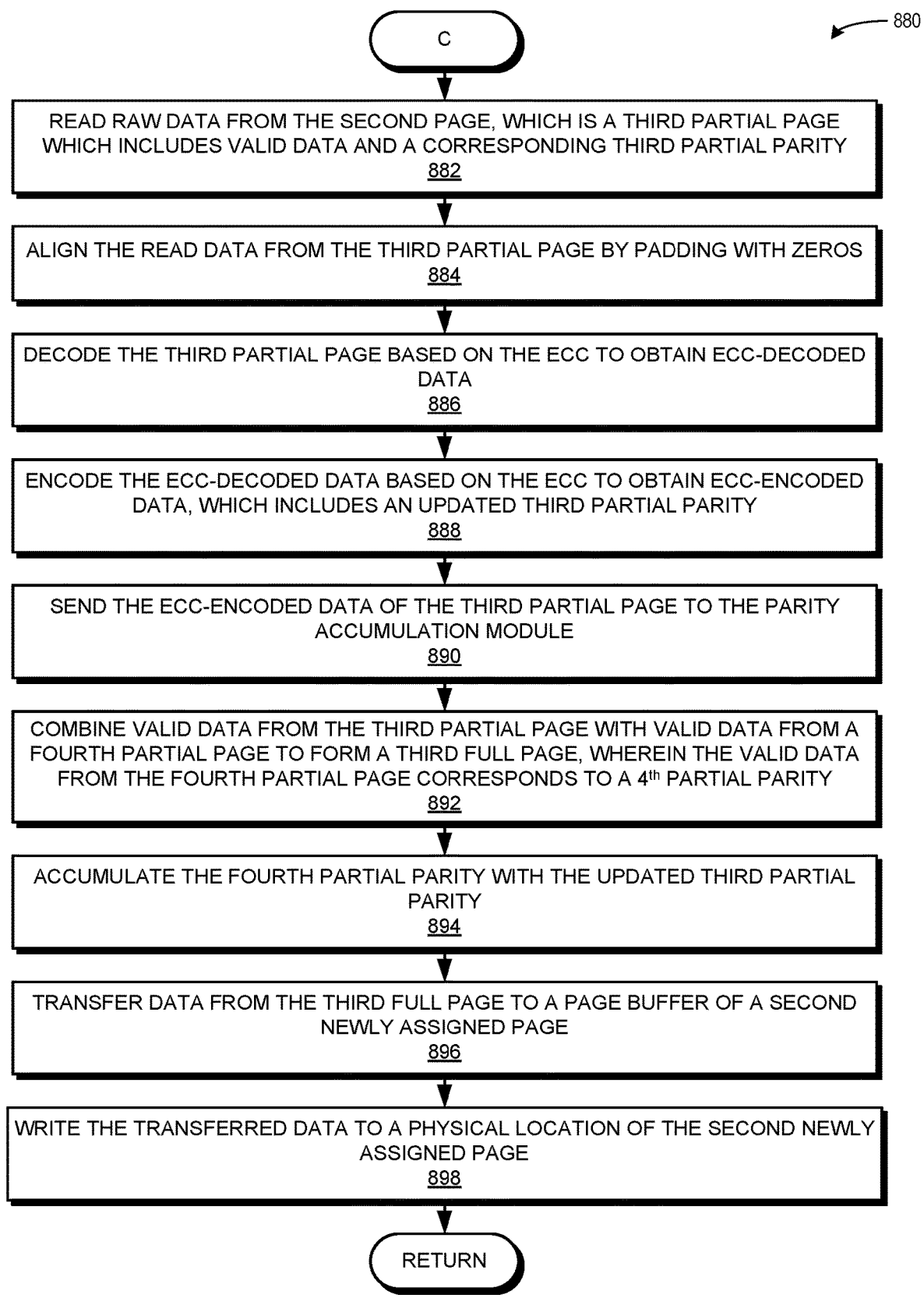
FIG. 8D presents a flowchart illustrating a method for facilitating data storage, in accordance with an embodiment of the present application.

FIG. 8D presents a flowchart illustrating a method for facilitating data storage, in accordance with an embodiment of the present application. During operation, the system reads raw data from the second page, which is a third partial page which includes valid data, empty space, and a third partial parity corresponding to the valid data in the third partial page (operation 882). The system aligns the read data from the third partial page by padding with zeros (operation 884). The system decodes the third partial page based on the ECC to obtain ECC-decoded data (operation 886). The system encodes the ECC-decoded data to obtain ECC-encoded data, which includes an updated third partial parity (operation 888). The system sends the ECC-encoded data of the third partial page to the parity accumulation module (operation 890). The system combines valid data from the third partial page with valid data from a fourth partial page to form a third full page, wherein the valid data from the fourth partial page corresponds to a fourth partial parity (operation 892). The valid data from the fourth partial page can be associated with a host write operation or a background write operation.

The system accumulates the fourth partial parity with the updated third partial parity (operation 894). The system transfers data from the third full page to a page buffer of a second newly assigned page (operation 896). The transferred data from the third full page can include the combined data and the accumulated parity. The system writes the transferred data to a physical location of the second newly assigned page (operation 898), and the operation returns.

Figure 9:
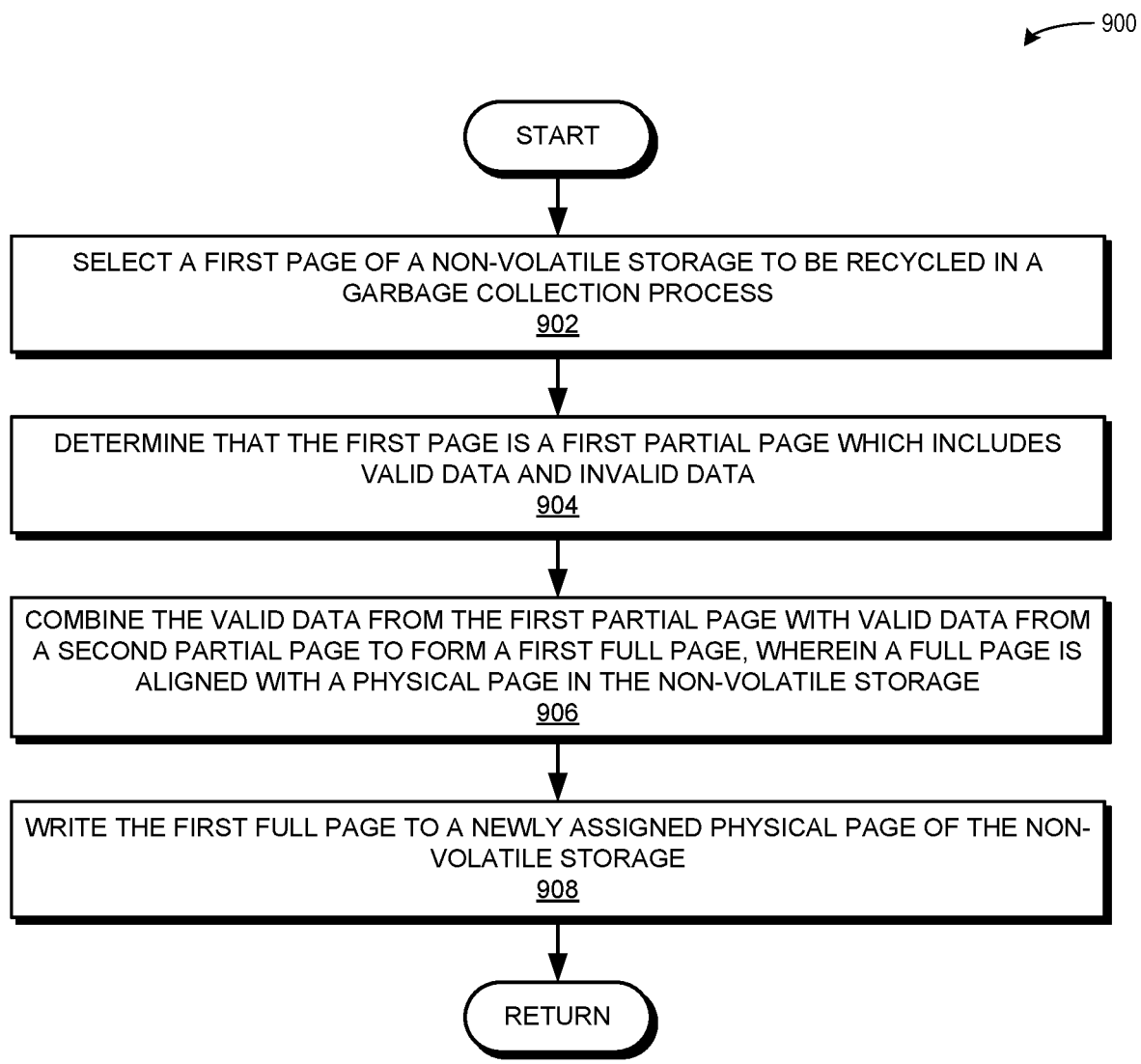
FIG. 9 presents a flowchart illustrating a method for facilitating data storage, in accordance with an embodiment of the present application.

FIG. 9 presents a flowchart 900 illustrating a method for facilitating data storage, in accordance with an embodiment of the present application. During operation, the system selects a first page of a non-volatile storage to be recycled in a garbage collection process (operation 902). The system determines that the first page is a first partial page which includes valid data and invalid data (operation 904). The system combines the valid data from the first partial page with valid data from a second partial page to form a first full page, wherein a full page is aligned with a physical page in the non-volatile storage (operation 906). The system writes the first full page to a newly assigned physical page of the non-volatile storage (operation 908), and the operation returns.

Exemplary Computer System

Figure 10:
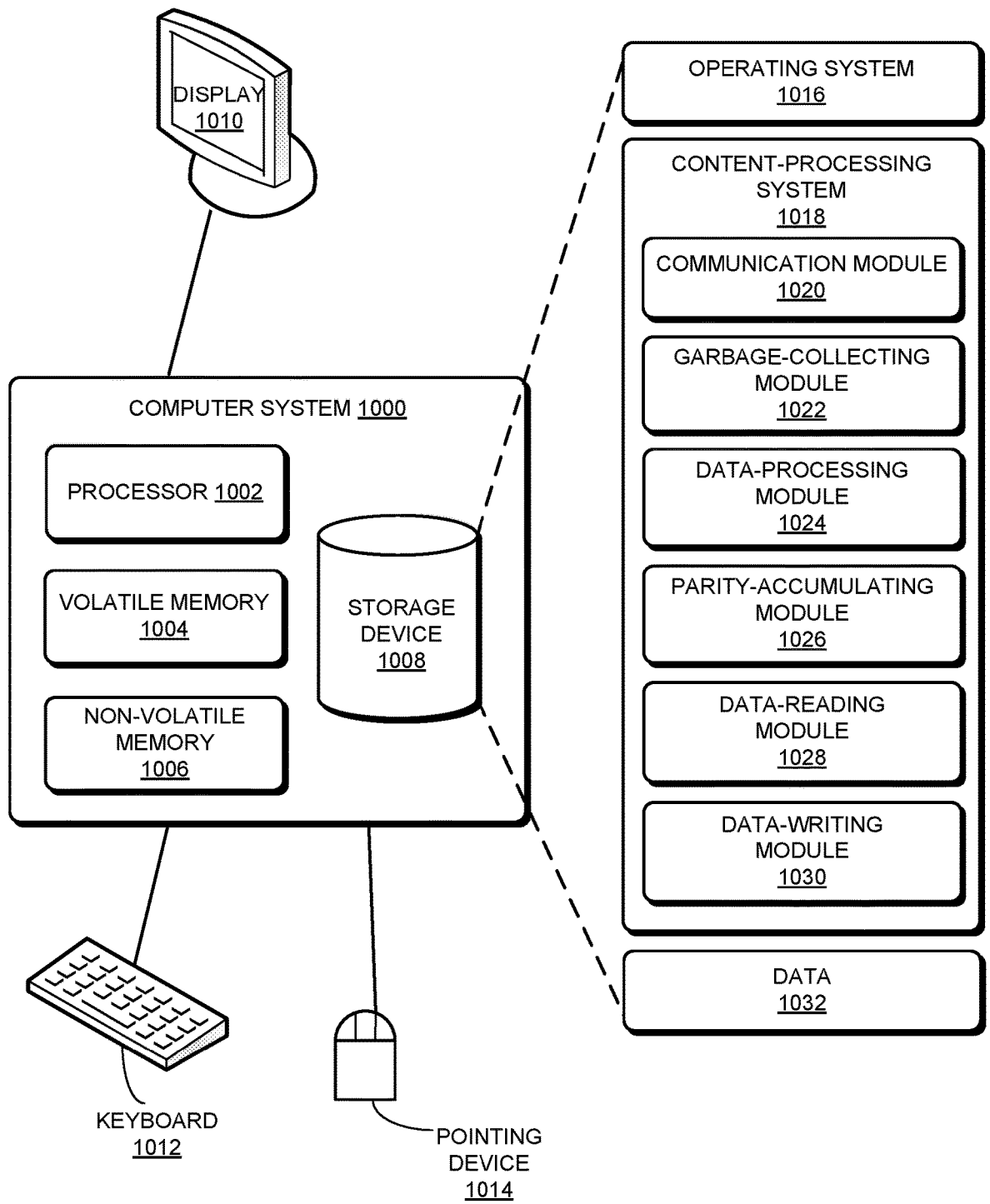
FIG. 10 illustrates an exemplary computer system that facilitates data storage, in accordance with an embodiment of the present application.

FIG. 10 illustrates an exemplary computer system 1000 that facilitates data storage, in accordance with an embodiment of the present application. Computer system 1000 includes a processor 1002, a volatile memory 1004, a non-volatile memory 1006, and a storage device 1008. Computer system 1000 may be a computing device or a storage device. Volatile memory 1004 can include memory (e.g., RAM) that serves as a managed memory, and can be used to store one or more memory pools. Non-volatile memory 1006 can include flash memory or any memory which can be used for persistent storage. Computer system 1000 can be coupled to a display device 1010, a keyboard 1012, and a pointing device 1014. Storage device 1008 can store an operating system 1016, a content-processing system 1018, and data 1032.

Content-processing system 1018 can include instructions, which when executed by computer system 1000, can cause computer system 1000 to perform methods and/or processes described in this disclosure. For example, content-processing system 1018 can include instructions for receiving and transmitting data packets, including a request to read or write data, an I/O request, a stream of data, I/O, data associated with a host write or a background write, data to be retrieved, encoded, aligned, and stored, and a block or a page of data (communication module 820).

Content-processing system 1018 can further include instructions for selecting a first page of a non-volatile storage to be recycled in a garbage collection process (garbage-collecting module 1022). Content-processing system 1018 can include instructions for determining that the first page is a first partial page which includes valid data and invalid data (garbage-collecting module 1022). Content-processing system 1018 can also include instructions for combining the valid data from the first partial page with valid data from a second partial page to form a first full page, wherein a full page is aligned with a physical page in the non-volatile storage (data-processing module 1024). Content-processing system 1018 can include instructions for writing the first full page to a first newly assigned physical page of the non-volatile storage (data-writing module 1030).

Content-processing system 1018 can additionally include instructions for detecting a setting which allows noise in the garbage collection process (garbage-collecting module 1022). Content-processing system 1018 can include instructions for reading valid data and corresponding parity from a partial page or a full page (data-reading module 1028). Content-processing system 1018 can include instructions for accumulating a first parity with a second parity, including a noisy parity (parity-accumulating module 1026). Content-processing system 1018 can include instructions for aligning, encoding, padding, encrypting, decrypting, compressing, decompressing, ECC-encoding, ECC-decoding, CRC-checking, and processing data (data-processing module 1024).

Data 1032 can include any data that is required as input or that is generated as output by the methods and/or processes described in this disclosure. Specifically, data 1032 can store at least: data to be stored, written, loaded, moved, retrieved, accessed, deleted, encoded, aligned, recycled, refreshed, checked, or copied; metadata; a stream of data; a logical sector, block, or page of data; a physical sector, block, or page of data; an I/O; a host I/O; a host write request; a background write operation; a garbage collection process; valid data; invalid data; zeros; a full page of valid data; a partial page with both valid data and invalid data; parity information or data; a parity; a partial parity; an incremental parity; noisy parity; an indication or a setting or a condition of a noisy garbage collection; a predetermined threshold; an accumulated parity; an indicator of a page buffer or a NAND plane or a newly assigned physical page; and an error correction code (ECC).

Figure 11:
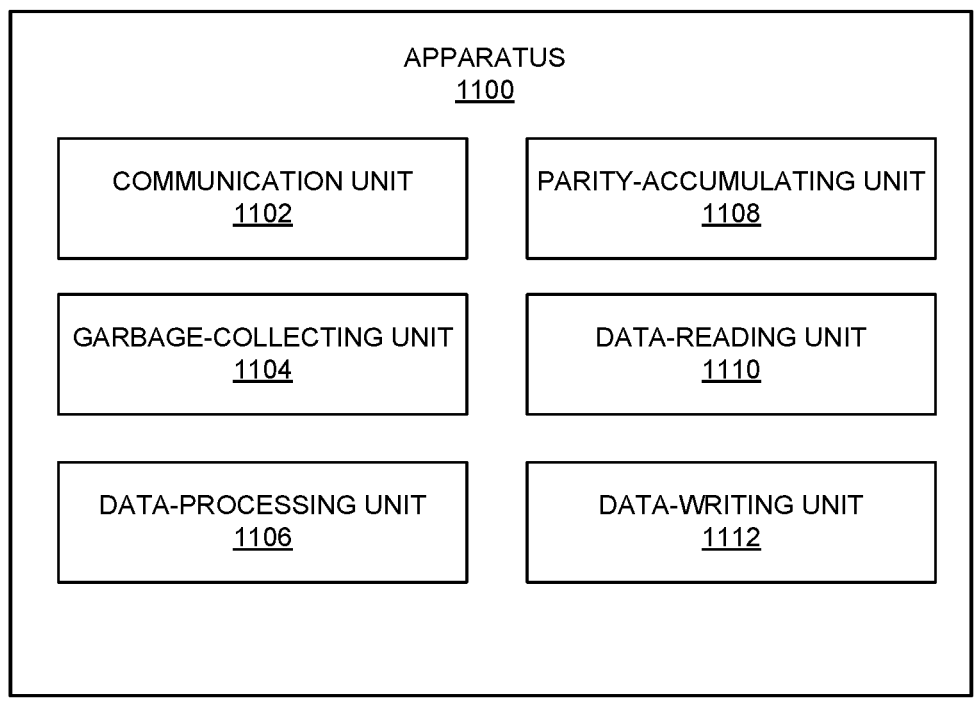
FIG. 11 illustrates an exemplary apparatus that facilitates data storage, in accordance with an embodiment of the present application.

FIG. 11 illustrates an exemplary apparatus 1100 that facilitates data storage, in accordance with an embodiment of the present application. Apparatus 1100 can comprise a plurality of units or apparatuses which may communicate with one another via a wired, wireless, quantum light, or electrical communication channel. Apparatus 1100 may be realized using one or more integrated circuits, and may include fewer or more units or apparatuses than those shown in FIG. 11. Further, apparatus 1100 may be integrated in a computer system, or realized as a separate device which is capable of communicating with other computer systems and/or devices. Specifically, apparatus 1100 can comprise units 1102-1112 which perform functions or operations similar to modules 1020-1030 of computer system 1000 of FIG. 10, including: a communication unit 1102; a garbage-collecting unit 1104; a data-processing unit 1106; a parity-accumulating unit 1108; a data-reading unit 1110; and a data-writing unit 1112.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating data storage, the method comprising:
    selecting a first page of a non-volatile storage to be recycled in a garbage collection process, wherein the first page is a first partial page which includes valid data, invalid data, and a noisy parity corresponding to the valid data and the invalid data;
    detecting a setting which allows noise in the garbage collection process;
    determining a second partial page which includes valid data corresponding to a second partial parity;
    combining the valid data from the first partial page with the valid data from the second partial page to form a first full page, wherein a full page is aligned with a physical page in the non-volatile storage;
    accumulating the second partial parity with the noisy parity; and
    writing the first full page to a first newly assigned physical page of the non-volatile storage.

2. The method of claim 1, further comprising:
    prior to combining the valid data from the first partial page with the valid data from the second partial page:
        reading the valid data from the first partial page; and
        reading the valid data from the second partial page.

3. The method of claim 2, further comprising:
    sending the read valid data and the noisy parity from the first partial page to a parity accumulation module;

aligning the valid data from the second partial page by padding with zeros; and encoding the valid data from the second partial page to obtain the second partial parity, wherein the second partial parity and the noisy parity are accumulated by the parity accumulation module.

4. The method of claim 1, wherein the valid data from the second partial page is associated with a host write operation, a background write process, or a garbage collection process.

5. The method of claim 1, further comprising:

in response to determining that the first page is a second full page which is filled with valid data:
reading the valid data from the second full page;
transferring the read data to a page buffer of a NAND plane of a second newly assigned physical page; and
writing the transferred data to the second newly assigned physical page.

6. The method of claim 1, further comprising:

in response to detecting a setting which does not allow noise in the garbage collection process:
reading all data from a second page to be recycled; and
performing, on the second page, a decoding and an encoding based on an error correction code (ECC).

7. The method of claim 6, further comprising:

in response to determining that the second page is a second full page which is filled with valid data:
reading raw data from the second full page;
decoding the read raw data based on the ECC to obtain ECC-decoded data;
encoding the ECC-decoded data based on the ECC to obtain ECC-encoded data;
transferring the ECC-encoded data to a page buffer of a NAND plane of a second newly assigned physical page; and
writing the transferred data to the second newly assigned page.

8. The method of claim 6, further comprising:

in response to determining that the second page is a third partial page which includes valid data, empty space, and a third partial parity corresponding to the valid data in the third partial page:
reading raw data from the third partial page;
aligning the read data from the third partial page by padding with zeros;
decoding the read data from the third partial page based on the ECC to obtain ECC-decoded data;
encoding the ECC-decoded data based on the ECC to obtain ECC-encoded data, which includes an updated third partial parity;
sending the ECC-encoded data of the third partial page to a parity accumulation module;
combining valid data from the third partial page with valid data from a fourth partial page to form a third full page, wherein the valid data from the fourth partial page corresponds to a fourth partial parity;
accumulating, by the parity accumulation module, the fourth partial parity with the updated third partial parity;
transferring data in the third full page to a page buffer of a NAND plane of a second newly assigned page of the non-volatile memory; and
writing the transferred data to the second newly assigned physical page.

9. A computer system for facilitating data storage, the system comprising:
a processor; and
a memory coupled to the processor and storing instructions, which when executed by the processor cause the processor to perform a method, wherein the computer system is the storage device, the method comprising:
selecting a first page of a non-volatile storage to be recycled in a garbage collection process, wherein the first page is a first partial page which includes valid data, invalid data, and a noisy parity corresponding to the valid data and the invalid data;
detecting a setting which allows noise in the garbage collection process;
determining a second partial page which includes valid data corresponding to a second partial parity;
combining the valid data from the first partial page with the valid data from the second partial page to form a first full page, wherein a full page is aligned with a physical page in the non-volatile storage;
accumulating the second partial parity with the noisy parity; and
writing the first full page to a first newly assigned physical page of the non-volatile storage.

10. The computer system of claim 9, wherein the method further comprises:
prior to combining the valid data from the first partial page with the valid data from the second partial page:
reading the valid data from the first partial page; and
reading the valid data from the second partial page.

11. The computer system of claim 10, wherein the method further comprises:
sending the read valid data and the noisy parity from the first partial page to a parity accumulation module;
aligning the valid data from the second partial page by padding with zeros; and
encoding the valid data from the second partial page to obtain the second partial parity,
wherein the second partial parity and the noisy parity are accumulated by the parity accumulation module.

12. The computer system of claim 9, wherein the valid data from the second partial page is associated with a host write operation, a background write process, or a garbage collection process.

13. The computer system of claim 9, wherein the method further comprises:
in response to determining that the first page is a second full page which is filled with valid data:
reading the valid data from the second full page;
transferring the read data to a page buffer of a NAND plane of a second newly assigned physical page; and
writing the transferred data to the second newly assigned physical page.

14. The computer system of claim 9, wherein the method further comprises:
in response to detecting a setting which does not allow noise in the garbage collection process:
reading all data from a second page to be recycled; and
performing, on the second page, a decoding and an encoding based on an error correction code (ECC).

15. The computer system of claim 14, wherein the method further comprises:
in response to determining that the second page is a second full page which is filled with valid data:
reading raw data from the second full page;
decoding the read raw data based on the ECC to obtain ECC-decoded data;
encoding the ECC-decoded data based on the ECC to obtain ECC-encoded data;

transferring the ECC-encoded data to a page buffer of a NAND plane of a second newly assigned physical page; and writing the transferred data to the second newly assigned page.

16. The computer system of claim 14, wherein the method further comprises:

in response to determining that the second page is a third partial page which includes valid data, empty space, and a third partial parity corresponding to the valid data in the third partial page:

reading raw data from the third partial page;

aligning the read data from the third partial page by padding with zeros;

decoding the read data from the third partial page based on the ECC to obtain ECC-decoded data;

encoding the ECC-decoded data based on the ECC to obtain ECC-encoded data, which includes an updated third partial parity;

sending the ECC-encoded data of the third partial page to a parity accumulation module;

combining valid data from the third partial page with valid data from a fourth partial page to form a third full page, wherein the valid data from the fourth partial page corresponds to a fourth partial parity;

accumulating, by the parity accumulation module, the fourth partial parity with the updated third partial parity;

transferring data in the third full page to a page buffer of a NAND plane of a second newly assigned page of the non-volatile memory; and writing the transferred data to the second newly assigned physical page.

17. A non-transitory computer-readable storage medium storing instructions that when executed by a computer cause the computer to perform a method, the method comprising:

selecting a first page of a non-volatile storage to be recycled in a garbage collection process, wherein the first page is a first partial page which includes valid data, invalid data, and a noisy parity corresponding to the valid data and the invalid data;

detecting a setting which allows noise in the garbage collection process;

determining a second partial page which includes valid data corresponding to a second partial parity;

combining the valid data from the first partial page with the valid data from the second partial page to form a first full page, wherein a full page is aligned with a physical page in the non-volatile storage;

accumulating the second partial parity with the noisy parity; and writing the first full page to a first newly assigned physical page of the non-volatile storage.

18. The storage medium of claim 17, wherein the method further comprises:

prior to combining the valid data from the first partial page with the valid data from the second partial page:

reading the valid data from the first partial page; and reading the valid data from the second partial page.

19. The storage medium of claim 18, wherein the method further comprises:

sending the read valid data and the noisy parity from the first partial page to a parity accumulation module;

aligning the valid data from the second partial page by padding with zeros; and encoding the valid data from the second partial page to obtain the second partial parity, wherein the second partial parity and the noisy parity are accumulated by the parity accumulation module.

20. The storage medium of claim 17, wherein in response to detecting a setting which does not allow noise in the garbage collection process, the method further comprises:

in response to determining that the second page is a second full page which is filled with valid data:

reading raw data from the second full page;

decoding the read raw data based on the ECC to obtain ECC-decoded data;

encoding the ECC-decoded data based on the ECC to obtain ECC-encoded data;

transferring the ECC-encoded data to a page buffer of a NAND plane of a second newly assigned physical page; and writing the transferred data to the second newly assigned page; and in response to determining that the second page is a third partial page which includes valid data, empty space, and a third partial parity corresponding to the valid data in the third partial page:

reading raw data from the third partial page;

aligning the read data from the third partial page by padding with zeros;

decoding the read data from the third partial page based on the ECC to obtain ECC-decoded data;

encoding the ECC-decoded data based on the ECC to obtain ECC-encoded data, which includes an updated third partial parity;

sending the ECC-encoded data of the third partial page to a parity accumulation module;

combining valid data from the third partial page with valid data from a fourth partial page to form a third full page, wherein the valid data from the fourth partial page corresponds to a fourth partial parity;

accumulating, by the parity accumulation module, the fourth partial parity with the updated third partial parity;

transferring data in the third full page to a page buffer of a NAND plane of a second newly assigned page of the non-volatile memory; and writing the transferred data to the second newly assigned physical page.

* * * * *